United States Patent
Senatro

(10) Patent No.: US 10,829,168 B2
(45) Date of Patent: Nov. 10, 2020

(54) AERODYNAMIC TRUCKING SYSTEMS

(71) Applicant: Strehl, LLC, Scottsdale, AZ (US)

(72) Inventor: Richard P. Senatro, Scottsdale, AZ (US)

(73) Assignee: Strehl, LLC, Scottsdale, AZ (US)

( * ) Notice: Subject to any disclaimer, the term of this patent is extended or adjusted under 35 U.S.C. 154(b) by 0 days.

(21) Appl. No.: 16/211,648

(22) Filed: Dec. 6, 2018

(65) Prior Publication Data

US 2019/0118871 A1    Apr. 25, 2019

Related U.S. Application Data

(63) Continuation-in-part of application No. 15/958,342, filed on Apr. 20, 2018, now Pat. No. 10,583,873, and a continuation of application No. 15/279,858, filed on Sep. 29, 2016, now Pat. No. 10,189,514, which is a continuation-in-part of application No. 15/277,172, filed on Sep. 27, 2016, now Pat. No. 9,975,583, and a continuation of application No. 15/277,172, filed on Sep. 27, 2016, now Pat. No. 9,975,583, which is a continuation of application No. 14/935,647, filed on Nov. 9, 2015, now Pat. No. 9,751,573, which is a continuation of application No. 14/247,504, filed on Apr. 8, 2014, now Pat. No. 9,211,919, which is a continuation of application No. 13/633,013, filed on Oct. 1, 2012, now Pat. No. 8,727,425, which is a
(Continued)

(51) Int. Cl.
*B62D 35/00* (2006.01)
*B62D 35/02* (2006.01)

(52) U.S. Cl.
CPC ......... *B62D 35/001* (2013.01); *B62D 35/008* (2013.01); *B62D 35/02* (2013.01); *Y02T 10/82* (2013.01); *Y02T 10/88* (2013.01); *Y10S 180/903* (2013.01)

(58) Field of Classification Search
CPC .. B62D 35/001; B62D 35/002; B62D 35/008; B62D 35/02
USPC ................................ 296/180.1, 180.4, 181.2
See application file for complete search history.

(56) References Cited

U.S. PATENT DOCUMENTS

| | | |
|---|---|---|
| 4,566,678 A | 1/1986 | Anderson |
| 4,611,847 A | 9/1986 | Sullivan |
| 4,746,160 A | 5/1988 | Wiesemeyer |

(Continued)

FOREIGN PATENT DOCUMENTS

| | | |
|---|---|---|
| WO | 2004062953 A2 | 7/2004 |
| WO | 2004087449 A3 | 10/2004 |

*Primary Examiner* — Jason S Daniels
(74) *Attorney, Agent, or Firm* — The Noblitt Group, PLLC

(57) ABSTRACT

The aerodynamic skirt assembly for attachment to a trailer may comprise a side skirt fairing, a transition, and a vented skirt fairing. The transition may be located aft of the side skirt fairing and forward of the vented skirt fairing. The vented skirt fairing may be located aft of the transition. The vented skirt fairing may comprise at least one longitudinal vent configured to allow air to flow therethrough. The vented skirt fairing may extend outwardly of the side of the trailer frame to accommodate the wheels. One or more mounting brackets may be used to couple the elongated skirt panel, the transition, and the vented skirt fairing to one or more transverse structural support members. A rear exhaust fairing may be located aft of the vented skirt fairing and coupled to one or more transverse structural support members.

19 Claims, 22 Drawing Sheets

Related U.S. Application Data continuation-in-part of application No. 13/117,891, filed on May 27, 2011, now Pat. No. 8,303,025.

(60) Provisional application No. 62/234,403, filed on Sep. 29, 2015, provisional application No. 61/639,830, filed on Apr. 27, 2012, provisional application No. 61/374,572, filed on Aug. 17, 2010, provisional application No. 61/349,183, filed on May 27, 2010.

(56) References Cited

U.S. PATENT DOCUMENTS

| | | |
|---|---|---|
| 5,280,990 A | 1/1994 | Rinard |
| 6,079,769 A | 6/2000 | Fannin et al. |
| 6,260,911 B1 | 7/2001 | Becker |
| 6,644,720 B2 | 11/2003 | Long et al. |
| 6,827,372 B2 | 12/2004 | Barr et al. |
| 6,837,536 B1 | 1/2005 | Schwartz |
| 6,974,178 B2 | 12/2005 | Ortega et al. |
| 7,008,005 B1 | 3/2006 | Graham |
| 7,093,889 B2 | 8/2006 | Graham |
| 7,163,258 B2 | 1/2007 | Dyer, II et al. |
| 7,404,592 B2 | 7/2008 | Reiman et al. |
| 7,497,502 B2 | 3/2009 | Wood |
| 7,578,541 B2 | 8/2009 | Layfield et al. |
| 7,578,542 B2 | 8/2009 | Layfield et al. |
| 7,604,284 B2 | 10/2009 | Reiman et al. |
| 7,686,385 B2 | 3/2010 | Dolan |
| 7,748,772 B2 | 7/2010 | Boivin et al. |
| 7,780,224 B2 | 8/2010 | Roush |
| 7,887,120 B2 | 2/2011 | Boivin et al. |
| 7,938,475 B2 | 5/2011 | Boivin et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 8,292,351 B2 | 10/2012 | Boivin et al. |
| 8,449,017 B2 | 5/2013 | Boivin et al. |
| 8,678,474 B1 | 3/2014 | Boivin et al. |
| 8,979,172 B2 | 3/2015 | Reiman et al. |
| 9,669,883 B2 | 6/2017 | Bassily et al. |
| 9,669,884 B2 | 6/2017 | Bassily et al. |
| 2006/0152038 A1 | 7/2006 | Graham |
| 2007/0120397 A1 | 5/2007 | Layfield et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0296930 A1 | 12/2008 | Roush et al. |
| 2009/0212595 A1 | 8/2009 | Heppel et al. |
| 2009/0212596 A1 | 8/2009 | Reiman et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0264690 A1 | 10/2010 | Brown et al. |
| 2011/0062749 A1 | 3/2011 | Graham et al. |
| 2011/0089716 A1 | 4/2011 | Hall |
| 2011/0148142 A1 | 6/2011 | Kint |
| 2012/0153668 A1 | 6/2012 | van Raemdonck |
| 2013/0106135 A1 | 5/2013 | Fraskovsky et al. |
| 2014/0217776 A1 | 8/2014 | Senatro |
| 2014/0265438 A1 | 9/2014 | Kronemeyer |
| 2015/0015027 A1 | 1/2015 | Wirth |
| 2015/0015029 A1 | 1/2015 | Wiegel |

AERODYNAMIC TRUCKING SYSTEMS

CROSS-REFERENCES TO RELATED APPLICATIONS

The present application is a continuation of U.S. patent Ser. No. 15/279,858 filed Sep. 29, 2016 entitled "AERODYNAMIC TRUCKING SYSTEMS," which claims the benefit of U.S. Provisional Application Ser. No. 62/234,403, filed Sep. 29, 2015, entitled "METHODS AND APPARATUS FOR AN AERODYNAMIC TRUCKING SYSTEM", which is a continuation in part of U.S. Nonprovisional patent application Ser. No. 15/277,172 filed Sep. 27, 2016, now U.S. Pat. No. 9,975,583 entitled "AERODYNAMIC TRUCKING SYSTEMS", which is a continuation of U.S. Nonprovisional patent application Ser. No. 14/935,647 filed Nov. 9, 2015, now U.S. Pat. No. 9,751,573 entitled "AERODYNAMIC TRUCKING SYSTEMS", which is a continuation of U.S. Nonprovisional patent application Ser. No. 14/247,504, filed Apr. 8, 2014, now U.S. Pat. No. 9,211,919 entitled "AERODYNAMIC TRUCKING SYSTEMS", which is a continuation of U.S. Nonprovisional patent application Ser. No. 13/633,013 filed Oct. 1, 2012, now U.S. Pat. No. 8,727,425 entitled, "AERODYNAMIC TRUCKING SYSTEMS", which claims the benefit of U.S. Provisional Application Ser. No. 61/639,830, filed Apr. 27, 2012, entitled "AERODYNAMIC TRUCKING SYSTEMS", which is a continuation-in-part of U.S. Nonprovisional patent application Ser. No. 13/117,891 filed May 27, 2011, now U.S. Pat. No. 8,303,025 entitled "AERODYNAMIC TRUCKING SYSTEMS", which claims the benefit of U.S. Provisional Application Ser. No. 61/349,183, filed May 27, 2010, entitled "AERODYNAMIC TRUCKING SYSTEMS"; and, which claims the benefit of U.S. Provisional Application Ser. No. 61/374,572, filed Aug. 17, 2010, entitled "AERODYNAMIC TRUCKING SYSTEMS"; and incorporates the disclosure of each application by reference; and the present application is a continuation in part of U.S. Nonprovisional patent application Ser. No. 15/958,342 filed Apr. 20, 2018 entitled "AERODYNAMIC TRUCKING SYSTEMS", which is a continuation of U.S. Nonprovisional patent application Ser. No. 15/277,172 filed Sep. 27, 2016, now U.S. Pat. No. 9,975,583 entitled "AERODYNAMIC TRUCKING SYSTEMS", which is a continuation of U.S. Nonprovisional patent application Ser. No. 14/935,647 filed Nov. 9, 2015, now U.S. Pat. No. 9,751,573 entitled "AERODYNAMIC TRUCKING SYSTEMS", which is a continuation of U.S. Nonprovisional patent application Ser. No. 14/247,504, filed Apr. 8, 2014, now U.S. Pat. No. 9,211,919 entitled "AERODYNAMIC TRUCKING SYSTEMS", which is a continuation of U.S. Nonprovisional patent application Ser. No. 13/633,013 filed Oct. 1, 2012, now U.S. Pat. No. 8,727,425 entitled, "AERODYNAMIC TRUCKING SYSTEMS", which claims the benefit of U.S. Provisional Application Ser. No. 61/639,830, filed Apr. 27, 2012, entitled "AERODYNAMIC TRUCKING SYSTEMS", which is a continuation-in-part of U.S. Nonprovisional patent application Ser. No. 13/117,891 filed May 27, 2011, now U.S. Pat. No. 8,303,025 entitled "AERODYNAMIC TRUCKING SYSTEMS", which claims the benefit of U.S. Provisional Application Ser. No. 61/349,183, filed May 27, 2010, entitled "AERODYNAMIC TRUCKING SYSTEMS"; and, which claims the benefit of U.S. Provisional Application Ser. No. 61/374,572, filed Aug. 17, 2010, entitled "AERODYNAMIC TRUCKING SYSTEMS"; and incorporates the disclosure of each application by reference. To the extent that the present disclosure conflicts with any referenced application, however, the present disclosure is to be given priority.

BACKGROUND OF THE TECHNOLOGY

This technology relates to aerodynamic trucking systems. More particularly, this technology relates to providing a system of aerodynamic apparatus configured to minimize aerodynamic drag and maintain smoother air flow over highway-operated vehicles, particularly long-haul tractor-trailer vehicles.

Most large long-haul cargo trailers exhibit less than optimal aerodynamic performance during highway operation. At highway speeds, conventional trailers develop a substantial amount of turbulent airflow in the region between the axles below the trailer box. This turbulence results in significant aerodynamic drag, increasing both fuel consumption and Nitrogen Oxide (NOx) emissions at the motorized towing vehicle. Additionally, temporarily sustained vibration of external vehicle surfaces due to transient wind-force loading is often associated with premature wear, noise, and early failures within such aerodynamic vehicle structures. A system and method to improve the aerodynamic performance of long-haul transport vehicles in the above-noted areas is described below.

SUMMARY OF THE TECHNOLOGY

An aerodynamic faring assembly for attachment to a trailer of a tractor-trailer may comprise a side skirt fairing, a transition, and a vented skirt fairing. The transition may be located aft of the side skirt fairing and forward of the vented skirt fairing. The vented skirt fairing may be located aft of the transition. The vented skirt fairing may comprise at least one longitudinal vent configured to allow air to flow therethrough. The vented skirt fairing may extend outwardly of the side of the trailer frame to accommodate the wheels. One or more mounting brackets may be used to couple the elongated skirt panel, the transition, and the vented skirt fairing to one or more or of the transverse structural support members. A rear exhaust fairing may be located aft of the vented skirt fairing and coupled to one or more or of the transverse structural support members.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Figure 1:
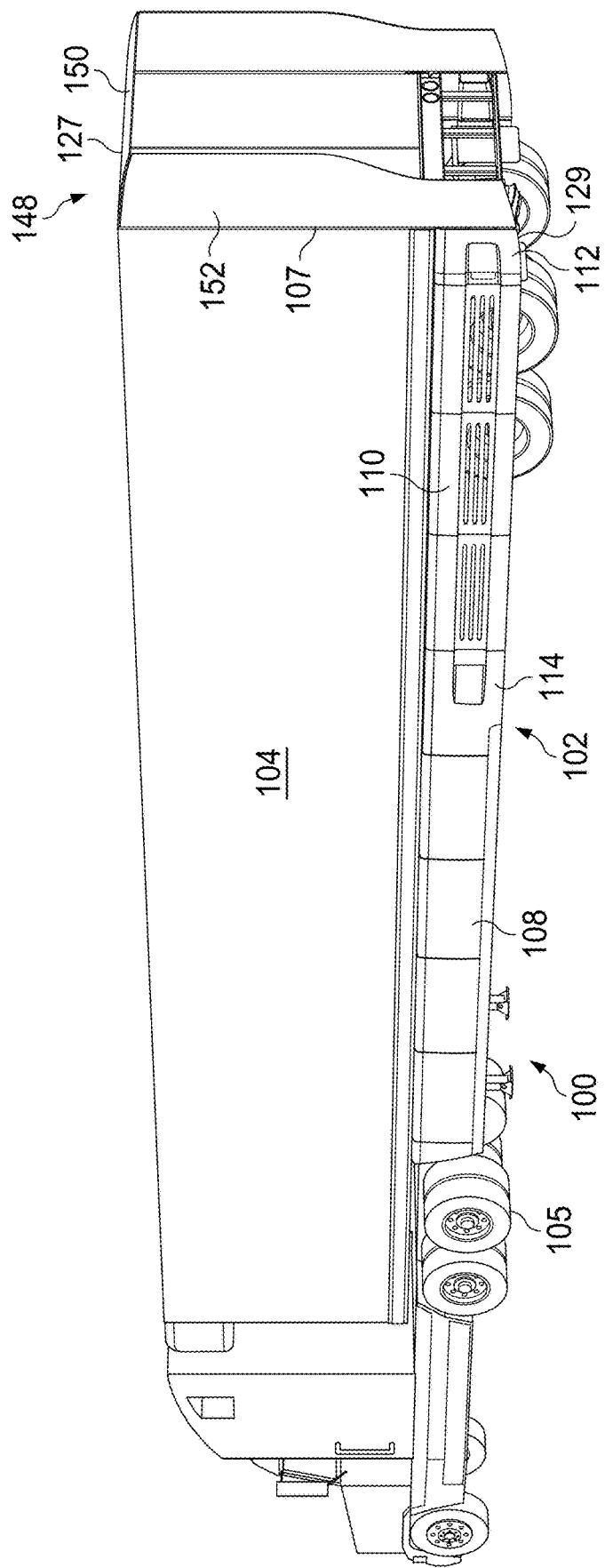
FIG. 1 representatively illustrates a perspective view of a truck and a trailer with an aerodynamic trucking system in accordance with an exemplary embodiment of the present technology.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of materials, connectors, panel, mounts, and the like for aerodynamic trucking systems, and the system described is merely one exemplary application for the technology.

Methods and apparatus for providing an aerodynamic trucking system designed to reduce aerodynamic drag and maintain smoother air flow over highway-operated vehicles, particularly long-haul tractor-trailer vehicles. Various representative implementations of the present technology may be applied to any system for reducing aerodynamic drag and maintaining smoother air flow over highway-operated vehicles, particularly long-haul tractor-trailer vehicles.

Generally an undercarriage of a conventional cargo trailer is comprised of groupings of various drag-producing components, which generally reside below a cargo-supporting floor deck, customarily having a rectangular shape. The drag-producing components of a semi-type cargo trailer undercarriage customarily include longitudinal and transverse structural support members, rear axles, brake components, mud flaps, wheels, tires, etc. An aerodynamic skirt fairing functions to direct air away from the central regions of the trailer undercarriage, which contain the majority of such drag-producing components. Such directional control of airflow during transport operations reduces the parasitic drag-producing interactions between the air and the above-noted structures. More specifically, aerodynamic skirt fairings of aerodynamic trucking system are preferably designed to reduce aerodynamic drag by promoting a more continuous laminar air flow along the sides of the cargo trailer. The aerodynamic skirt fairings further reduce turbulence along the sides of the cargo trailer to promote a greater region of more laminar air flow along the sides of the cargo trailer.

Despite a general conformity of van-type trailer designs within the trailer industry, variations exist between the offerings of the various trailer and component manufacturers. Aerodynamic trucking systems are typically designed to be universally adaptable to most conventional semi-type cargo trailers. To accommodate specific aerodynamic variations within the various trailer configurations, the aerodynamic skirt fairing system may be designed to be adjustably mountable to the undercarriage of the cargo trailer. The adjustment feature within the system allows an installer to optimize the aerodynamic performance of an installed aerodynamic skirt fairing system based on the unique aerodynamic requirements of a specific vehicle platform.

Figure 2:
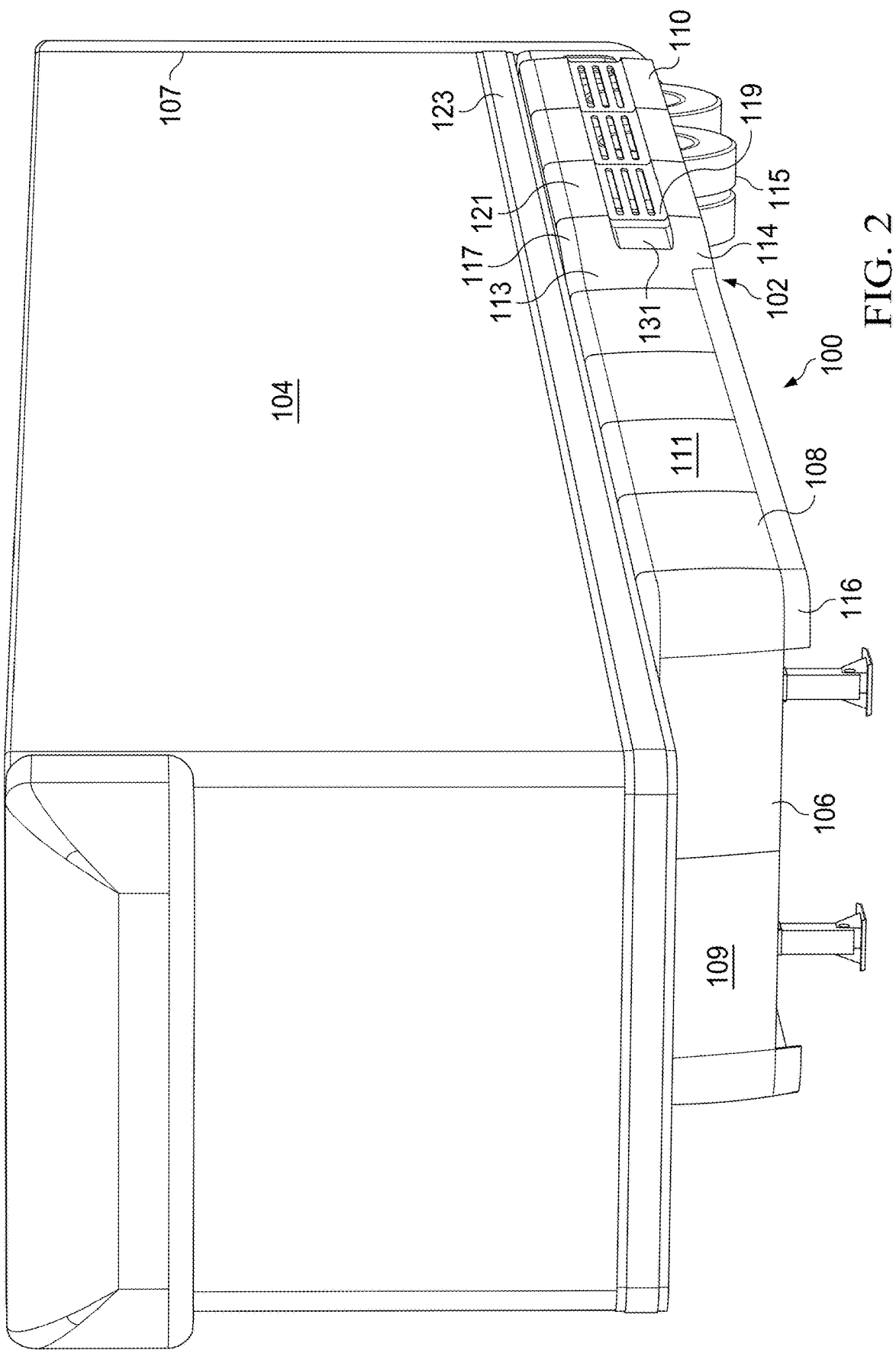
FIG. 2 representatively illustrates a perspective view of a trailer with an aerodynamic trucking system in accordance with an exemplary embodiment of the present technology.

Referring to FIGS. 1-2 an aerodynamic trucking system 100 is shown comprising an aerodynamic skirt faring system 102 mounted to an undercarriage of a cargo trailer 104. The aerodynamic trucking system 100 extends substantially around the perimeter of the cargo trailer 104 to reduce a relatively lower air pressure under, behind, and around the cargo trailer 104 as compared ambient conditions or areas of relatively higher pressure surrounding the cargo trailer 104.

The aerodynamic trucking system 100 may be constructed of any suitable material. Each of the components may be constructed from industry-standard materials selected to comprise a structural rigidity sufficient to support the required air deflection function, while offering a level of mechanical flexibility sufficient to deflect resiliently under small to moderate impact loads, thereby reducing the need for frequent panel repair or replacement due to permanent impact damage. Materials suitable for use in the aerodynamic skirt faring system 102 may comprise, such as, for example, aluminum, molded polymer panels, polymer-based composite panels, fiber-reinforced polymer panels, and injection molded polycarbonate, acrylonitrile butadiene styrene ("ABS") plastic, polypropylene, polyethylene, and polystyrene, polyvinyl chloride ("PVC") or any suitable combination or mixture thereof. In one embodiment, the material for the aerodynamic skirt faring system 102 may comprise an injection molded mixture of polycarbonate and ABS plastic. One of ordinary skill in the art will appreciate that, under appropriate circumstances, considering such issues as cost, user preference, etc., other material selections for the aerodynamic skirt faring system 102 may be used. It should be understood to be highly beneficial for the aerodynamic skirt faring system 102 to comprise light and more flexible materials, without exhibiting unstable behavior.

The aerodynamic skirt faring system 102 may comprise various combinations of at least one of a front skirt fairing 106, a pair of side skirt fairings 108, a pair of vented skirt fairings 110, and a pair of rear exhaust fairings 112. The front skirt fairing 106, side skirt fairings 108, and vented skirt fairings 110 can be sized appropriately and made of one or more than one components and constructed depending on any suitable configuration. In one embodiment, the front skirt fairing 106 may be removed. A pair of transitions 114 connects the side skirt fairings 108 and the vented skirt fairings 110.

Figure 22:
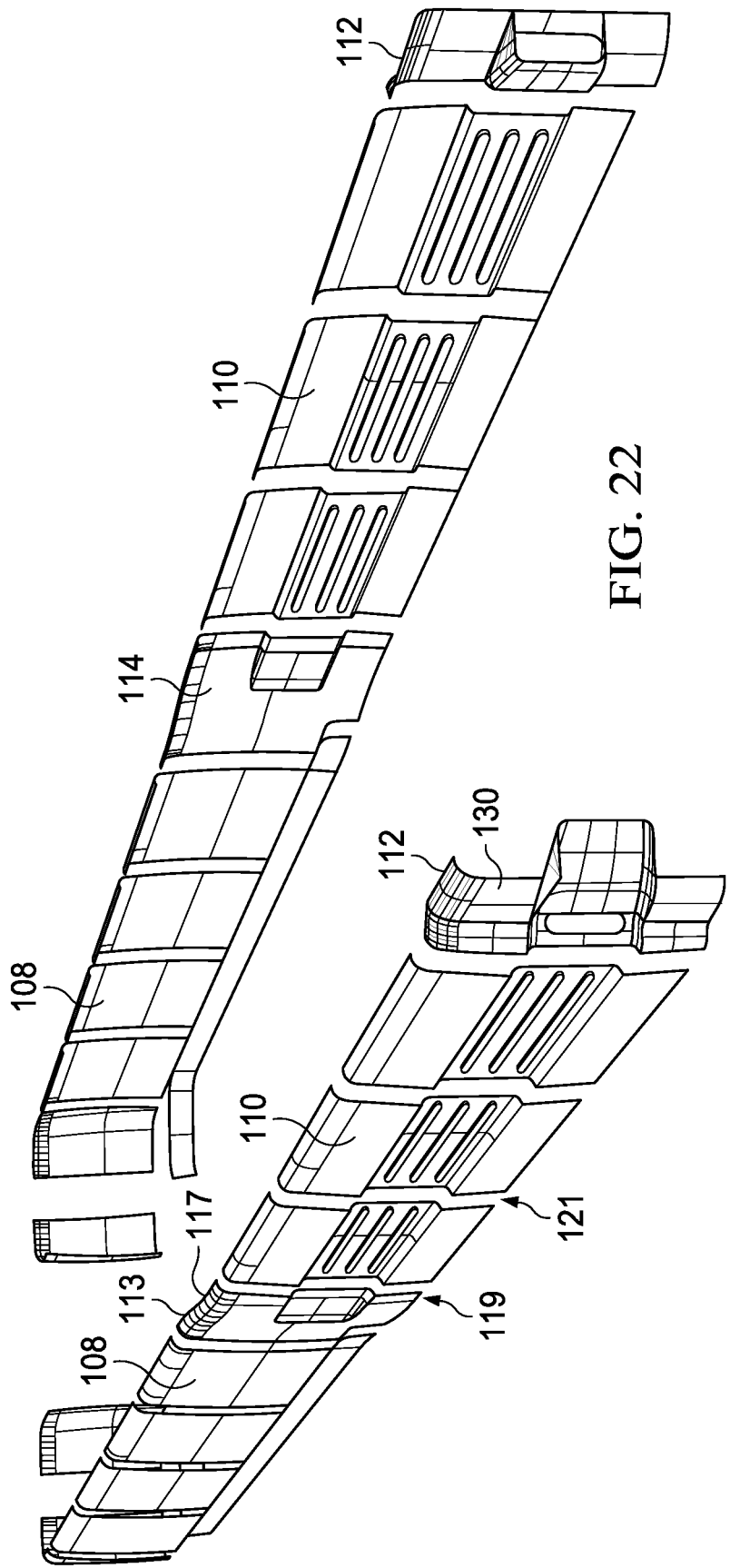
FIG. 22 representatively illustrates a rear, exploded view of the aerodynamic trucking system in accordance with an exemplary embodiment of the present technology.

FIG. 1 shows left-side perspective view, illustrating left-side components of an aerodynamic skirt fairing system 102, mounted in an operable position adjacent an underside of the cargo trailer 104, according to an embodiment of the present technology. It should be noted that the structures and arrangements of the depicted left-side components are a mirror of the right-side components. As shown in FIG. 22, the right-side and the left-side components are equally applicable to the mountable embodiments at both sides of the cargo trailer 104. The front skirt fairing 106, a pair of side skirt fairings 108, a pair of vented skirt fairings 110, and a pair of rear exhaust fairings 112 of aerodynamic skirt fairing system 102 may be coupled to the underside structures of the cargo trailer 104.

In general, the placement of the aerodynamic skirt fairing system 102 may be symmetrical and generally parallel, although the angle may be adjusted depending of the specific trailer and or tractor-trailer combination, with respect to longitudinal axis of cargo-supporting floor deck (not shown). The aerodynamic skirt fairing system 102 may be adjusted along the longitudinal axis of the cargo trailer 104.

Figure 21:
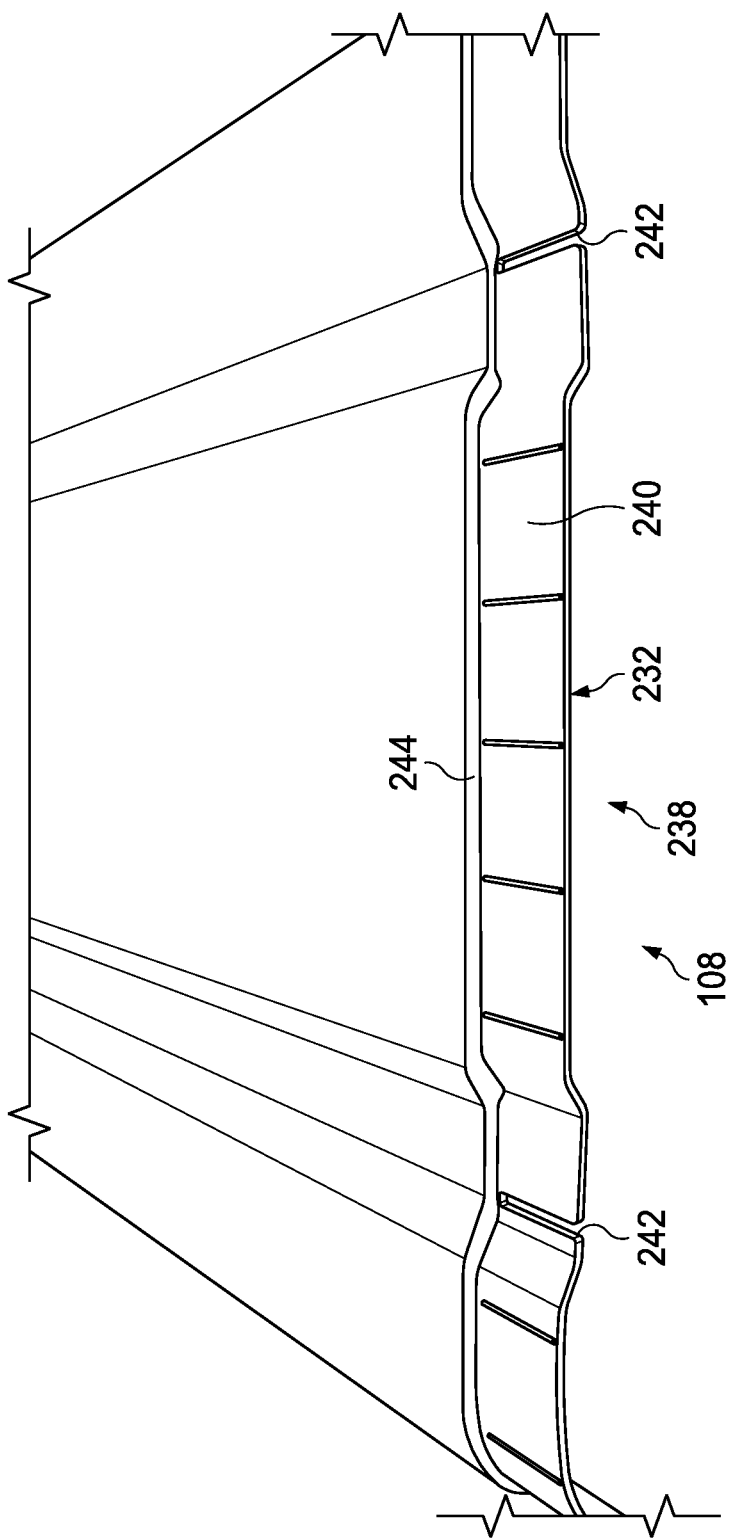
FIG. 21 representatively illustrates a partial perspective view of the second end of the side skirt fairing of FIG. 20.

The front skirt fairing 106 is located just aft of the truck wheels 105 and extends transverse of the centerline of the cargo trailer 104. The side skirts 108 and vented skirt fairings 110 extend rearward from the front skirt fairing 106 to approximately a rearmost end 107 of the cargo trailer 104. The front skirt fairing 106 may be connected to the side skirt fairings 108 by a pair of corner pieces 116. The side skirt fairings 108 are substantially straight and run parallel to the centerline of the cargo trailer 104. In one embodiment the side skirt fairing may comprise a profile as shown in FIG. 21. The front skirt fairing 106 and side skirt fairings 108 comprise substantially planar external faces 109, 111 that are essentially solid (that is, impermeable to the passage of air). The front skirt fairing 106 and side skirt fairings 108 may comprise a continuous single piece or multiple piece configuration. Each of the front skirt fairing 106 and side skirt fairings 108 are preferably mounted to the transverse structural support members 170 (shown in FIG. 14 and as understood by one of ordinary skill in the art) extending between sides of the trailer frame of the cargo trailer 104. In one embodiment, the front skirt fairing 106 may depend downwardly and rearwardly from the transverse structural support members 170.

In various embodiments, the components of the aerodynamic skirt fairing system 102 are constructed to interconnect with one another by any known method. In various embodiments, the components may comprise any type of male to female, tongue and groove, and/or hand to glove connector configuration as understood by one of ordinary skill in the art. In various embodiments, the components may simply abut. Additionally any of the front skirt fairing 106, side skirt fairings 108, vented skirt fairings 110, rear exhaust fairings 112, and transitions 114 may be connected to each other and/or one another in the manner described above and below.

Figure 17:
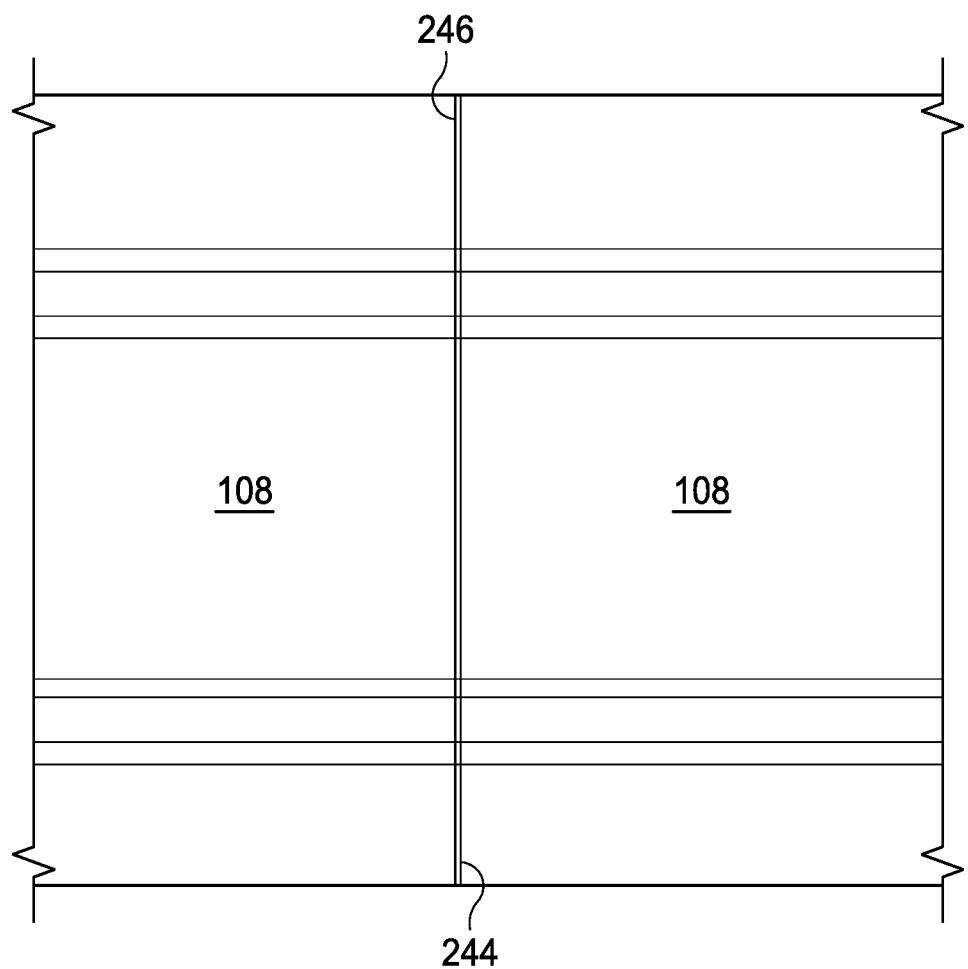
FIG. 17 representatively illustrates a side view of a pair of assembled side skirt fairings in accordance with an exemplary embodiment of the present technology.
Figure 18:
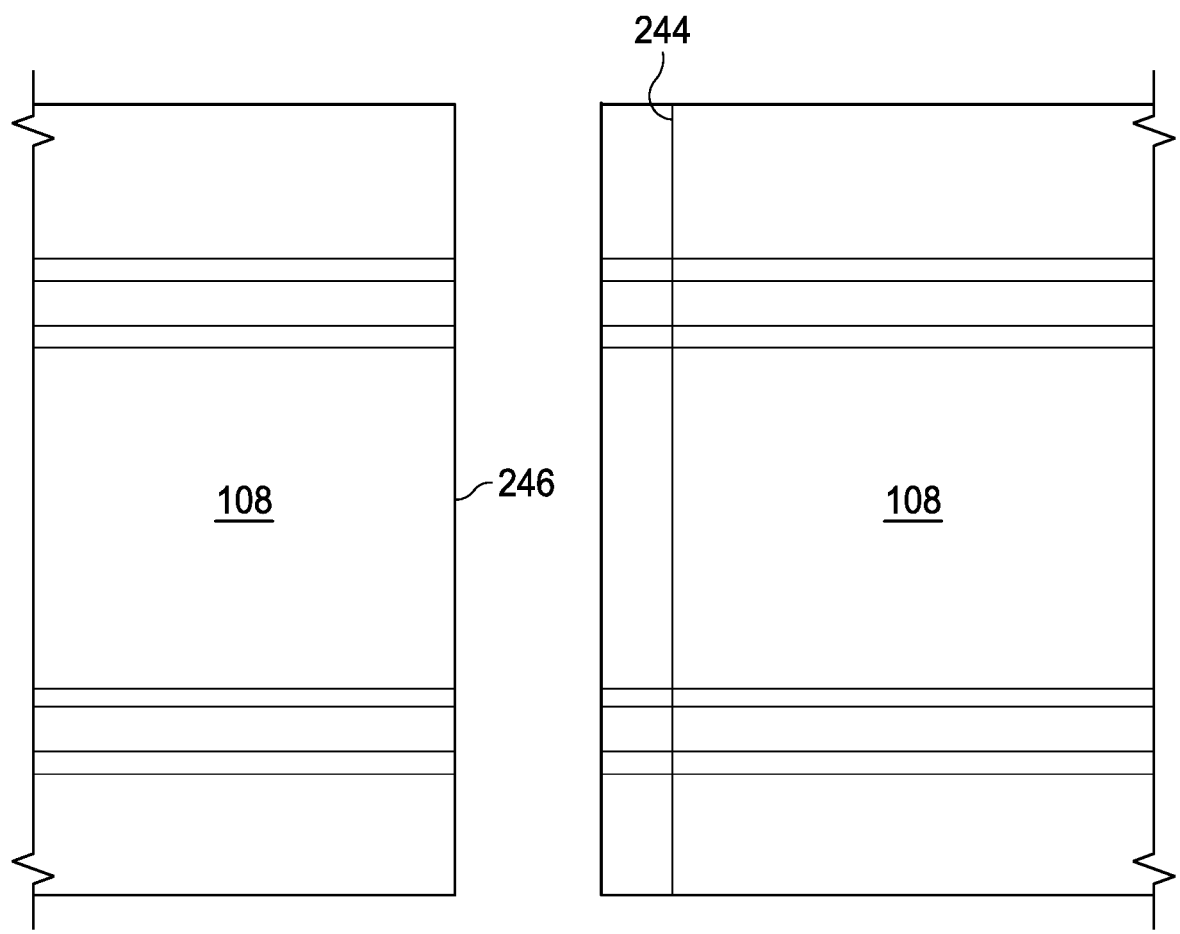
FIG. 18 representatively illustrates a side view of a pair of disassembled side skirt fairings in accordance with an exemplary embodiment of the present technology.
Figure 19:
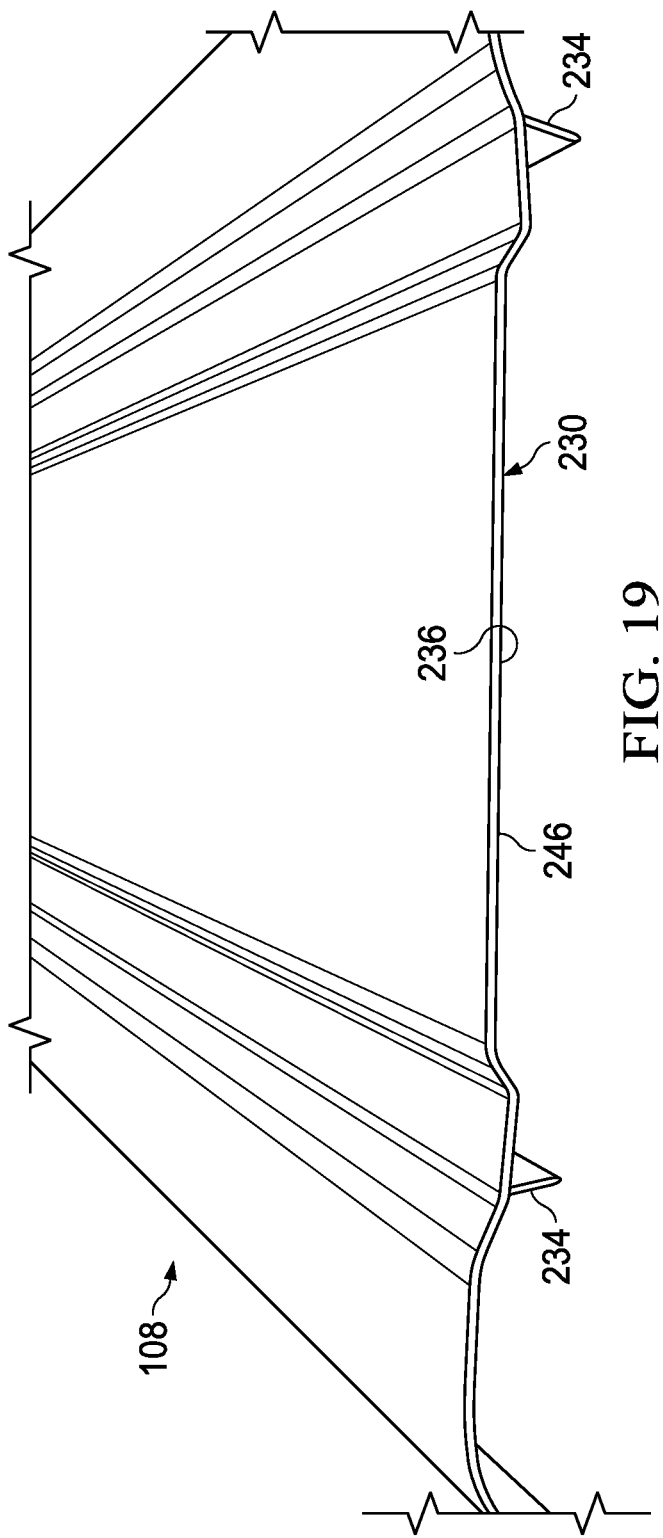
FIG. 19 representatively illustrates a partial perspective view of a first end of a side skirt fairing in accordance with an exemplary embodiment of the present technology.
Figure 20:
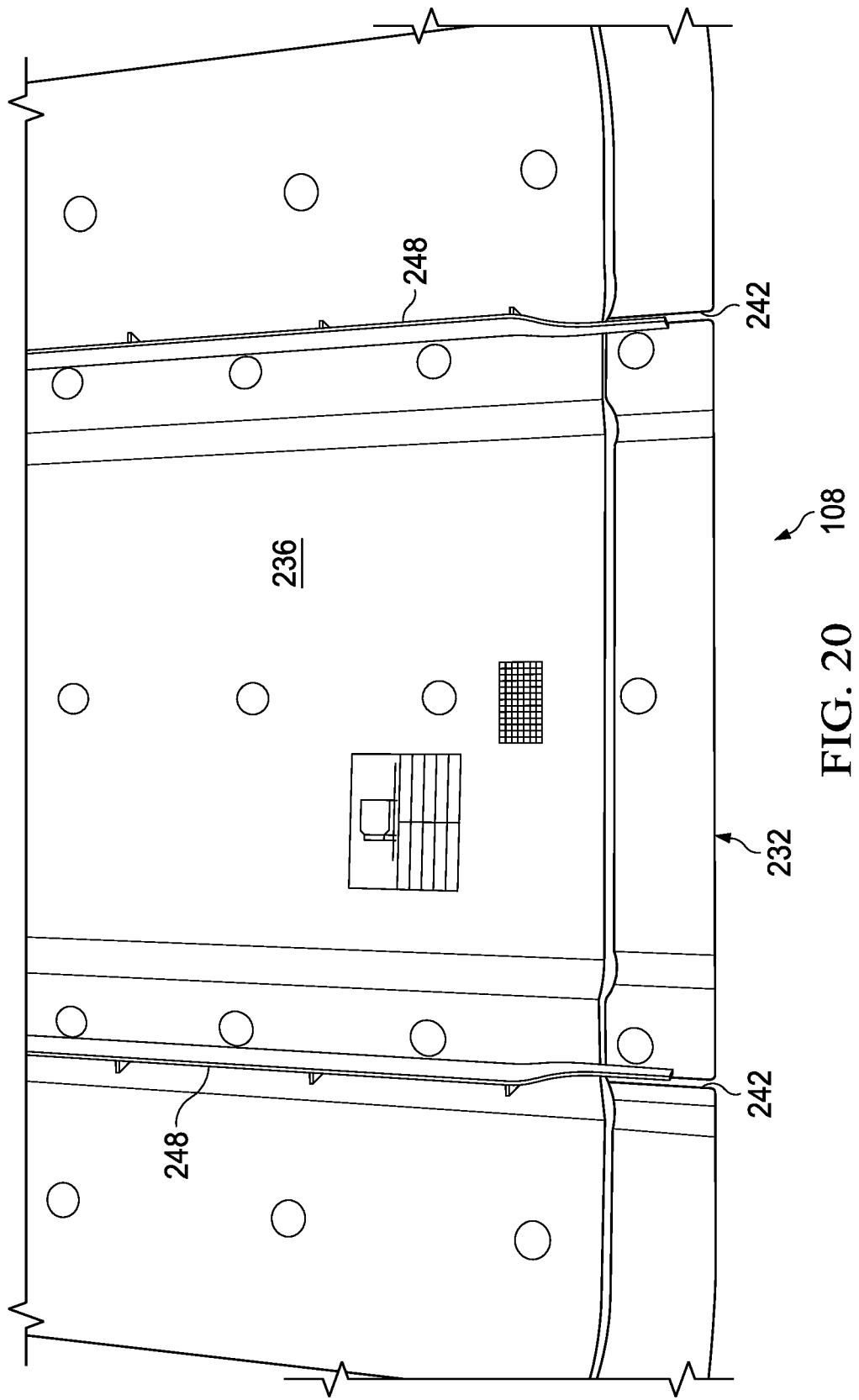
FIG. 20 representatively illustrates an underside of a partial perspective view of a second end of the side skirt fairing in accordance with an exemplary embodiment of the present technology.

In one embodiment, as shown in FIGS. 17-21 the side skirt fairings 108 may be coupled by mating portions located on opposite ends of each side skirt fairing 108. FIG. 17 shows a pair of assembled side skirt fairings 108 and FIG. 18 shows a pair of disassembled side skirt fairings 108. FIG. 19 shows a first end 230 of the side skirt fairing 108 and FIGS. 20 and 21 show a second end 232 of the side skirt fairing.

The first end 230 of the side skirt fairing may comprise a pair of tabs 234 depending generally perpendicularly downward from an inner face 236 of the side skirt fairing 108. The second end 232 of the side skirt fairing 108 comprises a receiving portion 238 that receives the first end 230. The receiving portion 238 may comprise a recessed area 240 and a pair of slots 242 that receive the tabs 234. The receiving portion 238 may comprise a ridge 244 that may abut an edge 246 of the first end 230 when assembled. The receiving portion 238 may comprise inset tabs 248 located inwardly of the slots 242 that receive the tabs 234 from the first end 230. In one embodiment, the tab 234 may be continuous and extend along the length of the inner face 236 from the first end 230 to the second end 232 of the side skirt fairing 108 to provide support. At the second end 232 tab 234 may become inset tab 248. It should be understood that one or more than one tab and slot configuration may be contemplated.

Figure 3:
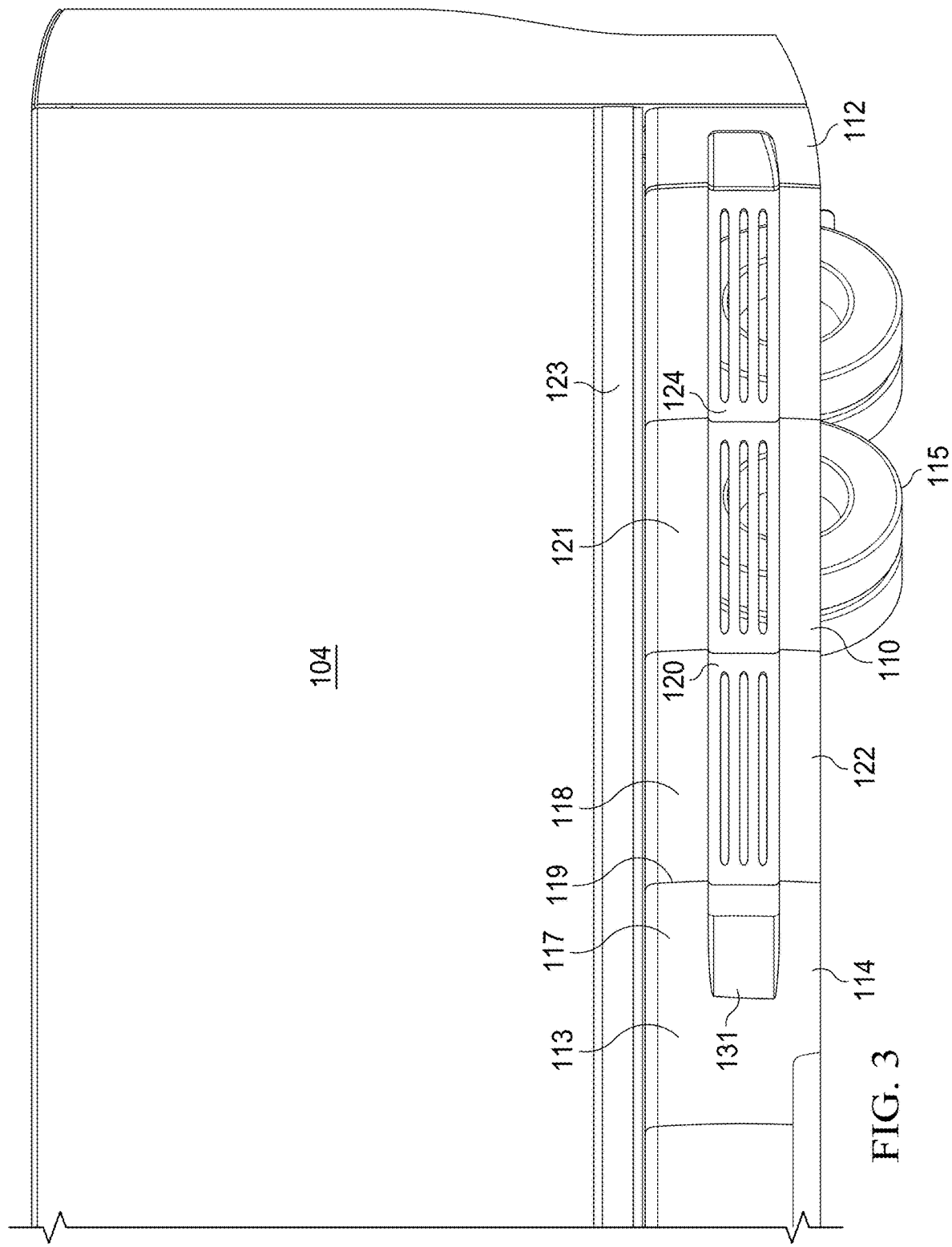
FIG. 3 representatively illustrates a partial perspective view of a trailer with an aerodynamic trucking system in accordance with an exemplary embodiment of the present technology.
Figure 4:
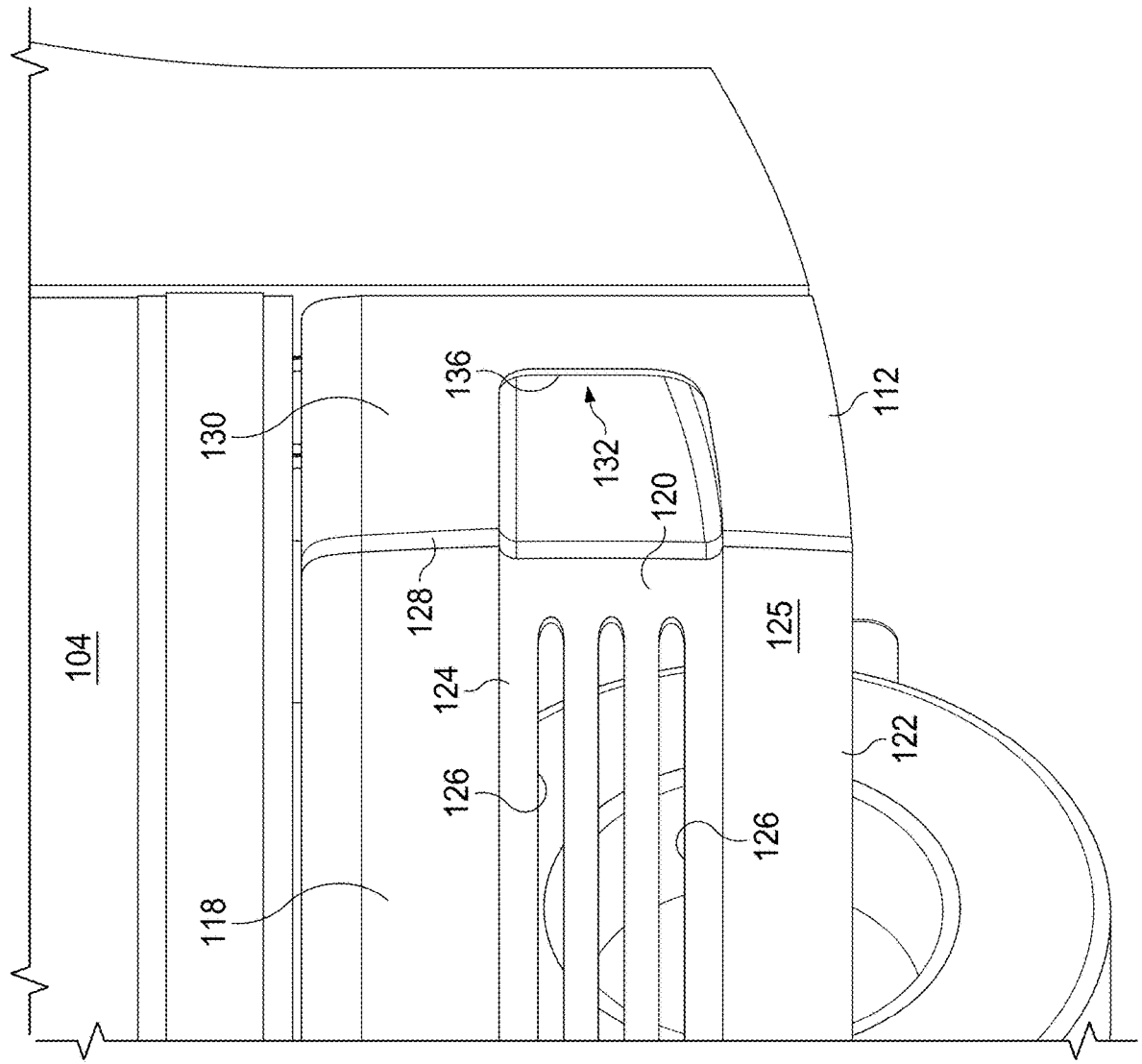
FIG. 4 representatively illustrates a partial perspective view of a vented side skirt and a rear exhaust fairing of the aerodynamic trucking system in accordance with an exemplary embodiment of the present technology.
Figure 5:
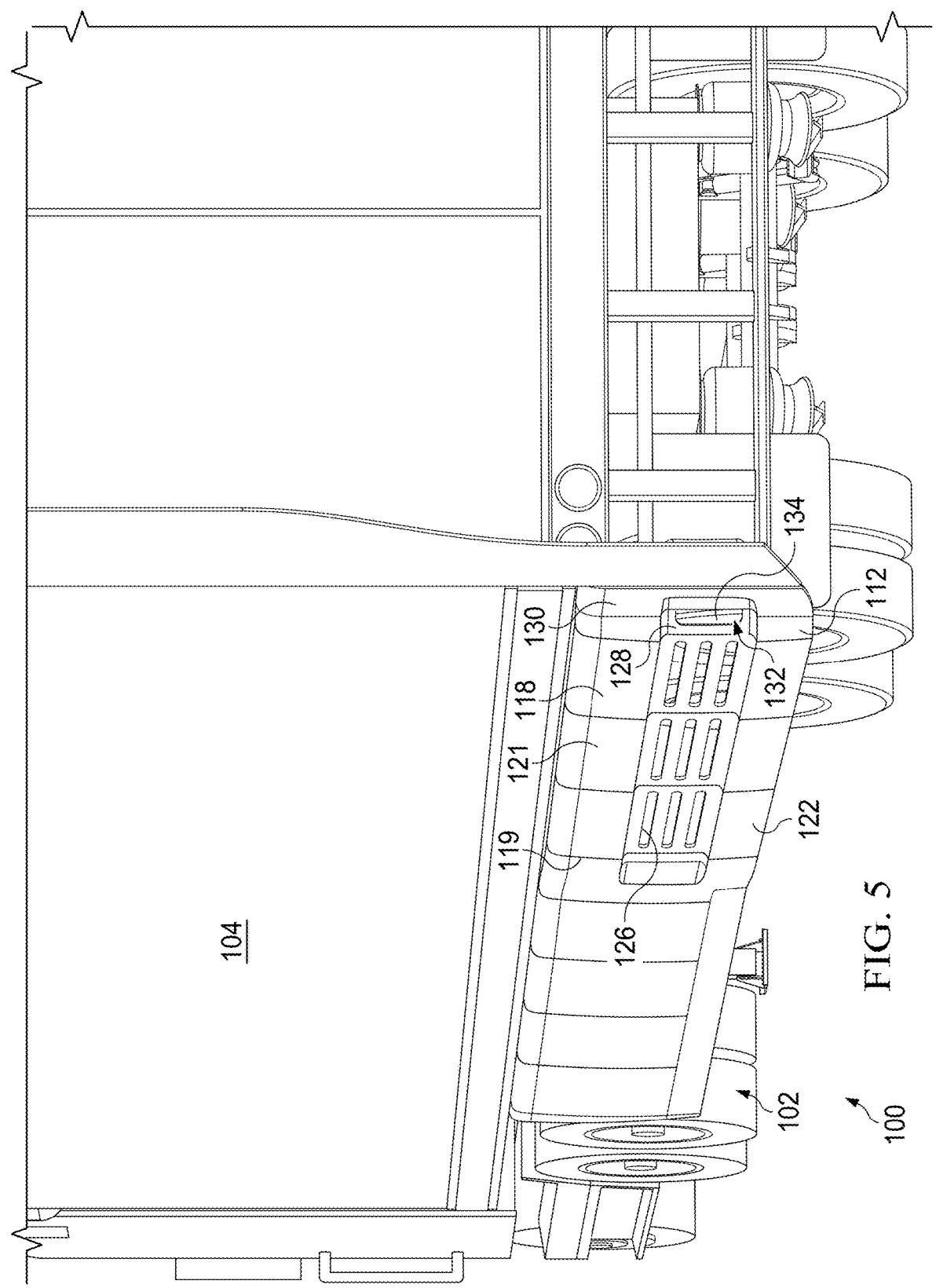
FIG. 5 representatively illustrates a partial, rear, perspective view of a truck and a trailer with an aerodynamic trucking system in accordance with an exemplary embodiment of the present technology.
Figure 6:
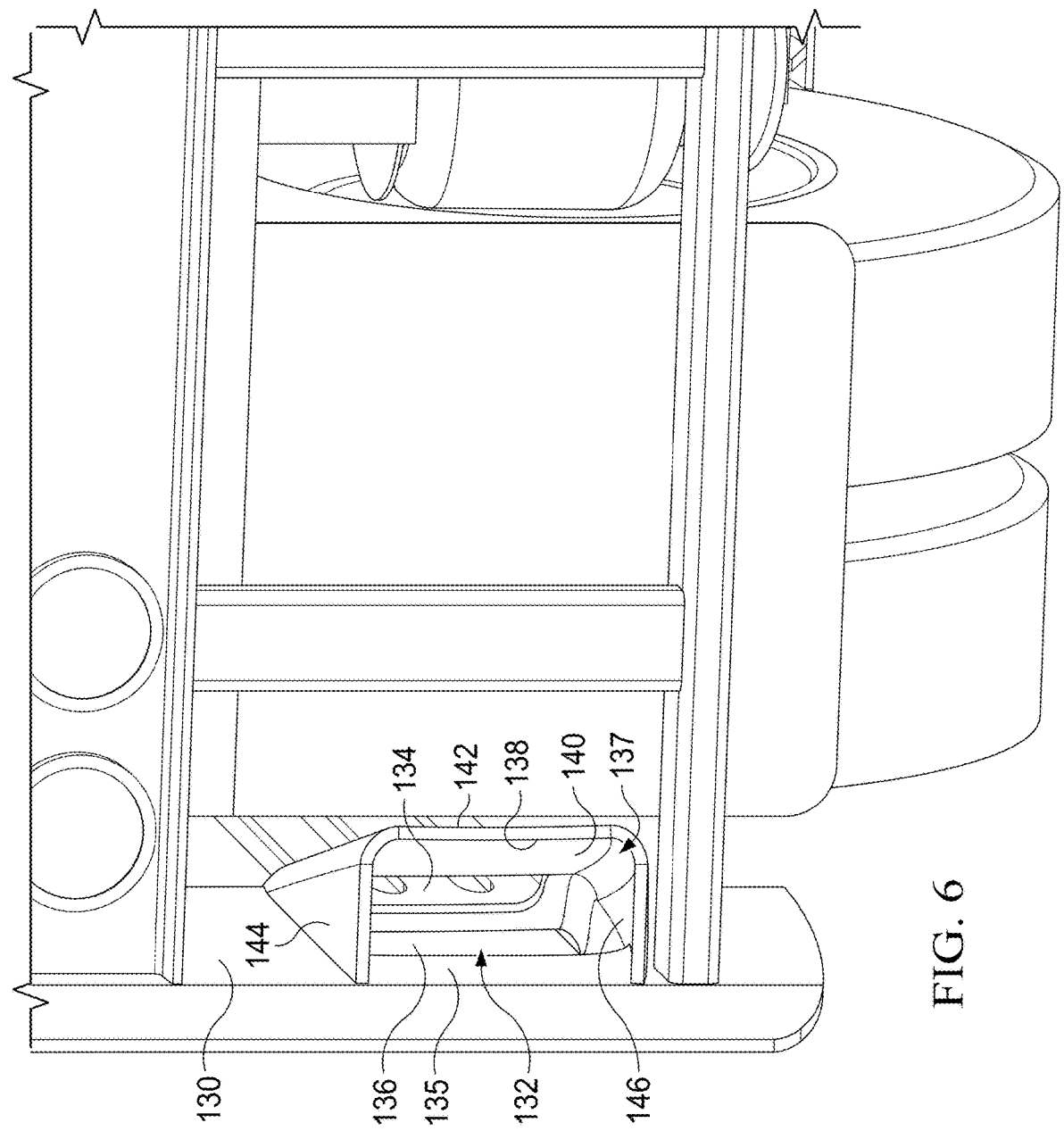
FIG. 6 representatively illustrates a partial rear view of a rear exhaust fairing of the aerodynamic trucking system in accordance with an exemplary embodiment of the present technology.

Referring to FIGS. 2 and 3, a pair of transitions 114 provides a smooth transition from a rear edge of the side skirt fairings 108 to a front edge of the vented skirt fairings 110. In one embodiment, the transitions 114 are configured to reside proximate the side skirt fairings 108 and the vented skirt fairings 110. In one embodiment the transitions 114 are configured to proximately contact the side skirt fairings 108 and the vented skirt fairings 110. In one embodiment, the transitions 114 are configured to not proximately contact the side skirt fairings 108 and the vented skirt fairings 110. In one embodiment, the transitions 114 are configured to reside proximate the side skirt fairings 108 and the vented skirt fairings 110. In one embodiment, the side skirt fairings 108, the transitions 114, and the vented skirt fairings 110 have a linear path in line with the side of the trailer 104 and parallel to the centerline of the trailer. In each of the above embodiments, the orientation of the transitions 114 still allow for upward rotation of the side skirt fairings 108 and the vented skirt fairings 110 as will be discussed below.

The transitions 114 may be angled slight outwardly from the side skirt fairings 108 but at no more than a 12 degree angle with respect to the centerline of the cargo trailer 104. In one embodiment, shown in FIG. 22, the transitions 114 may be angled slight outwardly from the side skirt fairings 108 but at no more than a 12 degree angle with respect to the centerline of the cargo trailer 104. In other words, to augment aerodynamic performance of the overall fairing assembly, a leading edge 113 of each transition 114 may be canted outwardly at an inclination of less than 12 degrees. In one embodiment, the leading edge 113 of each transition 114 is canted outwardly at an inclination of less than 12 degrees. In one embodiment, the leading edge 113 of each transition 114 is canted outwardly at an inclination of 7-10 degrees. In one embodiment, the leading edge 113 of each transition 114 is canted outwardly at an inclination of 7 degrees.

This slight angle provides additional clearance for the vented side skirt fairings 110 to be located an additional distance of no more than 3 inches outward of the side skirt fairings 108 to accommodate the trailer wheels 115. A smaller angle may be used to provide less clearance distance to accommodate various configurations and designs. As such, the linear path along the length of the cargo trailer 104 for the vented side skirt fairings 110 is located outward of the linear path of the side skirt fairings 108 in order to clear the tires on the trailer wheels 115. In standard configurations, the tires on the trailer wheels typically extend only to the outer base/trailer envelope of the cargo trailer 104. However, Federal law allows certain safety equipment devices, such as splash and spray suppression devices, to exceed the outer base/trailer envelope by no more than 3 inches. The aerodynamic skirt fairing system 102 that covers the tires on the trailer wheels 115 would provide a benefit in aiding splash and spray suppression. As such, the orientation of the transition 114 and vented skirt fairings 110 allow the cargo trailer 104 to comply with Federal law. In other words, the orientation of the transition 114 and the vented skirt fairings 110 allow a portion or portions of the aerodynamic skirt fairing system 102 to reside outside the outer base/trailer envelope.

Referring now to FIGS. 2-5 and 22, a trailing edge 117 of transition 114 may be formed to a substantially partially convex curve 119. The vented side skirt fairings 110 may comprise a similar profile of a substantially partially convex curve 121 that generally corresponds to the external shape of the trailer wheels 115. The curved nature of the arcuate profile of the transition 114, the vented side skirt fairings 110, and rear exhaust fairings 112 allows the components to be located in a position closely adjacent the trailer wheels 115, without the risk of contact interference. The arcuate profile of the vented side skirt fairings 110 also provides the 3 inch clearance in compliance with Federal law, as discussed above. If Federal Law changes to allow more or less than 3 inches clearance outside the outer base/trailer envelope then the clearance discussed above should be applicable with the new Federal Law.

The vented side skirt fairings 110 operate to more fully enclose the entire length of cargo trailer 104 to improve aerodynamic performance but still provide for airflow to the brakes and tires on the trailer wheels 115 such that they do not overheat. The vented side skirt fairings 110 may comprise multiple members configured to allow the trailer wheels 115 to be moved forward and rearward based on various configurations of the cargo trailer 104. The configuration of the vented side skirt fairings 110 and rear exhaust fairings 112 provides multiple types of air flow. In one embodiment the vented side skirt fairings substantially cover the trailer wheels 115 but allow for air passage to cool the brakes and tires on the trailer wheels 115.

The vented side skirt fairings 110 may comprise an upper panel 118, a vented panel 120, and a lower panel 122. The vented panel 120 resides between the upper and lower panels 118, 122 and is slightly recessed to form a channel 124. The channel may comprise one or more longitudinal vents and/or openings 126, which are oriented generally from forward to aft of the vented panel 120. The channel 124 aligns with a recessed channel 131 located in the transition 114. In one embodiment, the upper panel 118 may comprise an arcuate profile and the vented panel 120 and the lower panel 122 may depend generally vertically downwardly therefrom.

The vented side skirt fairings 110 may comprise a continuous, single piece or multiple pieces. The vented side skirt fairings 110 are mounted to the transverse structural support members 170 extending between sides of the trailer frame adjacent sides 123 of the cargo trailer 104 and extend generally vertically downwardly therefrom. The vented side skirt fairings 110 can be coupled to the cargo trailer 104 in any suitable manner as will be discussed in detail below.

Referring now to FIGS. 4-6 and 10-12, the rear exhaust fairings 112 are located aft of the vented skirt fairings 110. The rear exhaust fairings 112 comprise a forward face 128 and a rear panel 130 with an exhaust scoop 132. In one embodiment, the rear panel 130 may taper inwardly towards the centerline of the trailer from top to bottom. The forward face 128 is configured to transition the air from the vented side skirt fairings 110 to the rear of the cargo trailer 104. The rear panel 130 may be coupled to the forward face 128, which is inset a distance from an outer surface 125 of the vented side skirt fairings 110. The forward face 128 may comprise a vertical opening 134 or slot located therewithin. The exhaust scoop 132 may comprise an inlet opening 136 and a wall 138 having inner, outer, upper, and lower faces 140, 142, 144, 146. The rear panel 130 may comprise an inner wall 135 that when combined with the inner face 138, upper face 144, and lower face 146 provides an exit 137 for the air to flow therethrough.

The aerodynamic trucking system 100 is configured to manage airflow around, behind, and under a semi-type cargo trailer 104, with the goal of significantly reducing aerodynamic turbulence during operation. The vented side skirt fairings 110 and rear exhaust fairings 112 are configured to provide multiple types of air flow during operation of the truck and cargo trailer 104. The air may flow in a normal manner, along the upper panel 118, vented panel 120, and lower panel 122 of the vented side skirt fairings 110 outside of the cargo trailer 104. The air may flow within the channels 124, 131 of vented panel 120 and transition 114, but not through longitudinal vents and/or openings 126, and leave through the opening 136 in the exhaust scoop 132 located in the rear exhaust fairings 112. The flow of air through the exhaust scoop 132 out the exit 137 and out of the rear negates a portion of low air pressure behind the trailer to reduce negative pressure behind the trailer 104.

The air may flow within the channels 124, 131 of vented panel 120 and transition 114, through longitudinal vents and/or openings 126, over the tires and brakes, under the trailer, through the vertical opening or slot 134 in the forward face 128, and out the opening 136 in the exhaust scoop 132 outwardly of the outer face 142/wall 138. The flow of air through the longitudinal vents and/or openings 126 provides airflow over the tires and brakes for cooling and under the trailer before exhausting the air from the rear of the trailer 104. The flow of air through the exhaust scoop 132 outwardly of the outer face 142/wall 138 and out the exit 137 and under the cargo trailer 104 negates a portion of low air pressure behind the trailer 104 to reduce negative pressure behind the trailer 104.

The air may flow within the channel 124 of vented panel 120, through longitudinal vents and/or openings 126, over the tires and brakes and out the rear of the trailer 104 inwardly of the inner face 140/wall 138, but not through the vertical opening 134 or slot 134. The flow of air through the longitudinal vents and/or openings 126 provides airflow over the tires and brakes and under the trailer. The flow of air through the exhaust scoop 132 and inwardly of the outer face 142 out of the rear negates a portion of low air pressure behind the trailer 104 to reduce negative pressure behind the trailer 104 and also serves to cool the tires and brakes located on the trailer wheels 115.

Referring again to FIG. 1, the aerodynamic trucking system 100 may comprise an exit fairing system 148. The exit fairing system 148 may comprise a top fairing 150 and a pair of vertically oriented side fairings 152, which are rotatably coupled to the cargo trailer 104. In one embodiment the top fairing 150 and side fairings 152 may be coupled by an L-shaped bracket (not shown). In one embodiment, the top fairing 150 and side fairings 152 may be coupled by a bolted flange (not shown). In one embodiment, the top fairing 150 and side fairings 152 may be coupled by a spring assisted flange (not shown), which bias the top fairing 150 and side fairings 152 upwardly and outwardly, respectively, but still allow the top fairing 150 and side fairings 152 to deflect downwardly and inwardly. In one embodiment, the top fairing 150 and side fairings 152 may be coupled by an air cylinder assisted flange (not shown), which bias the top fairing 150 and side fairings 152 upwardly and outwardly, respectively, but still allow the top fairing 150 and side fairings 152 to deflect downwardly and inwardly.

The top fairing 150 may extend substantially the width of a top rear portion 127 of the cargo trailer 104. The vertically oriented side fairings 152 may extend from the top of the cargo trailer 104 to a lower portion 129 of the rear exhaust fairings 112.

Figure 9:
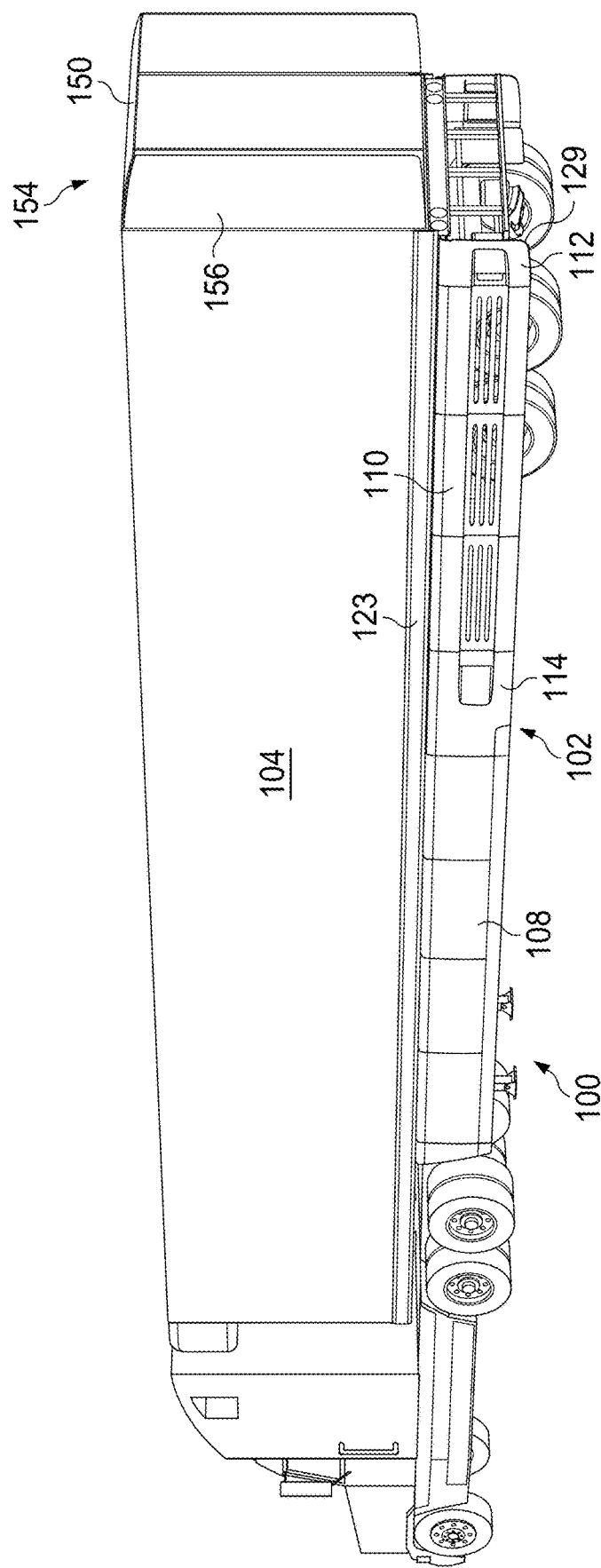
FIG. 9 representatively illustrates a perspective view of a truck and a trailer with an aerodynamic trucking system showing an alternative embodiment of the exit fairing system in accordance with an exemplary embodiment of the present technology.
Figure 10:
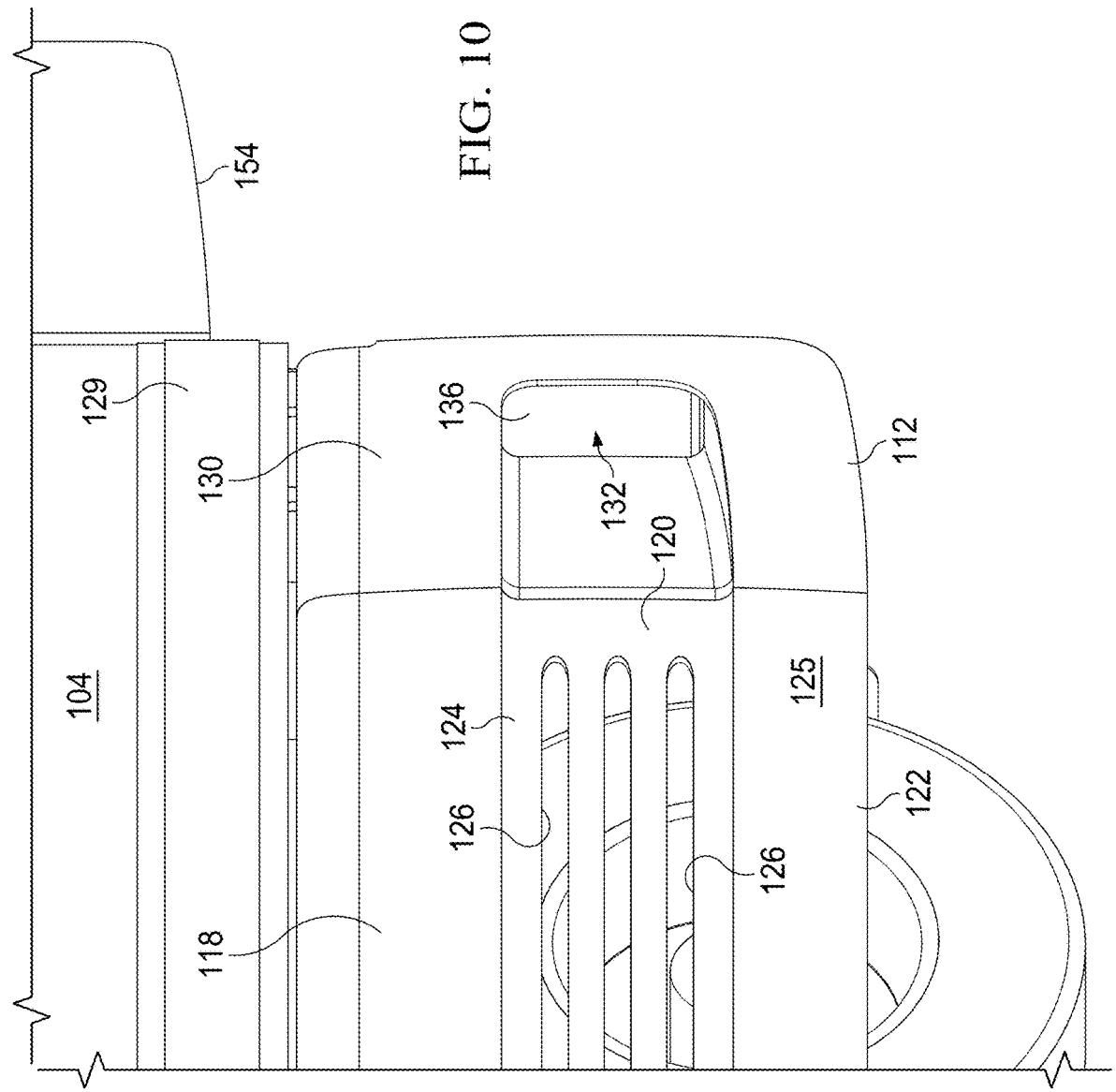
FIG. 10 representatively illustrates a partial perspective view of a vented side skirt and a rear exhaust fairing of the aerodynamic trucking system showing an alternative embodiment of the exit fairing system in accordance with an exemplary embodiment of the present technology.
Figure 11:
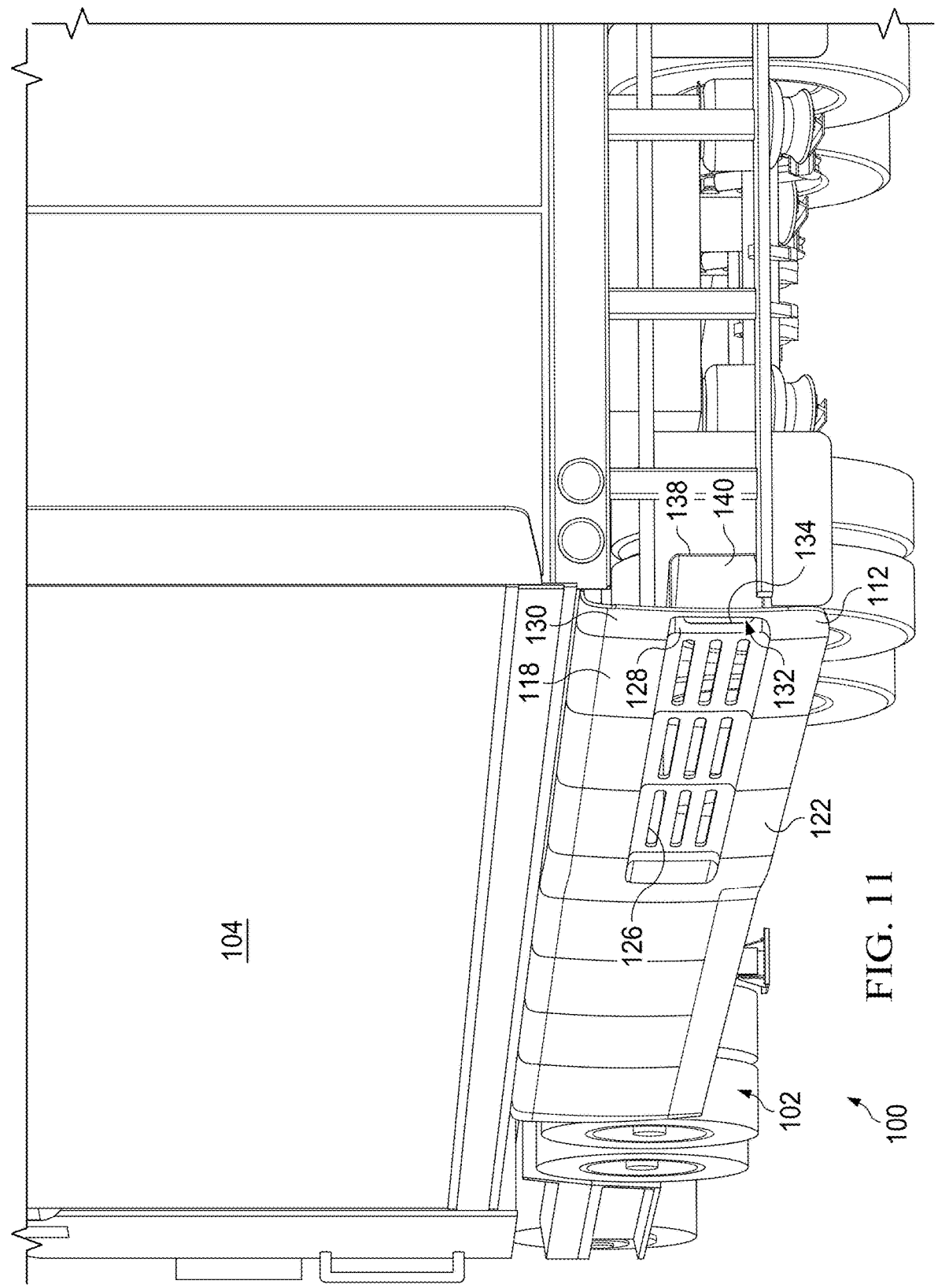
FIG. 11 representatively illustrates a partial, rear, perspective view of a truck and a trailer with an aerodynamic trucking system showing an alternative embodiment of the exit fairing system in accordance with an exemplary embodiment of the present technology.
Figure 12:
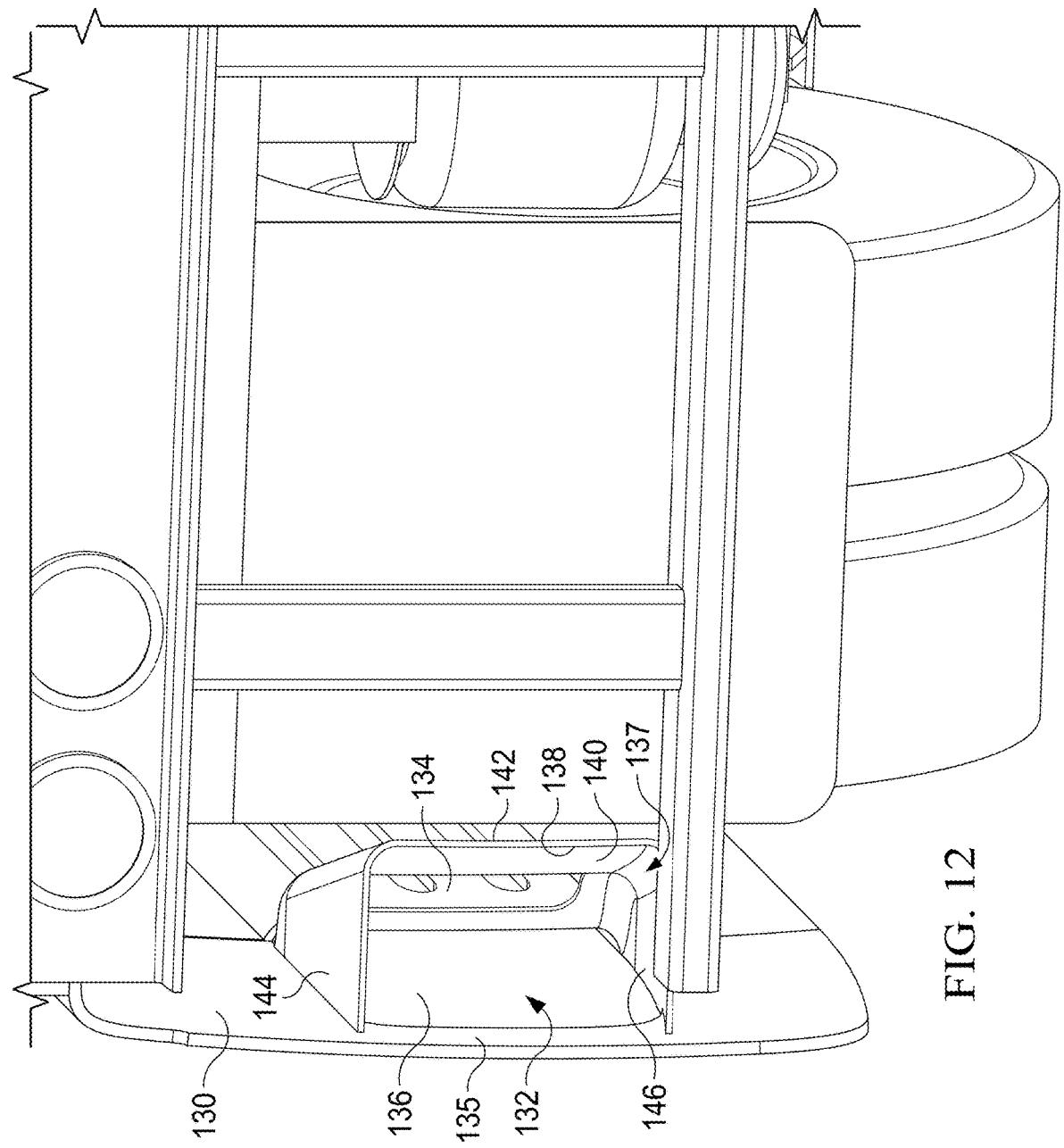
FIG. 12 representatively illustrates a partial rear view of a rear exhaust fairing of the aerodynamic trucking system showing an alternative embodiment of the exit fairing system in accordance with an exemplary embodiment of the present technology.

In another embodiment, shown in FIG. 9, the aerodynamic trucking system 100 may comprise an exit fairing system 154. The exit fairing system 154 may comprise top fairing 150 and a pair of vertically oriented side fairings 156, which are rotatably coupled to the cargo trailer 104 in the same manner as discussed above. The top fairing 150 extends substantially the width of a top rear portion 127 of the cargo trailer 104. The vertically oriented side fairings 156 extend from the top of the cargo trailer 104 to approximately the sides 123 of the cargo trailer 104.

In various embodiments the components of the aerodynamic trucking system 100 may be coupled to the underside structures of the cargo trailer 104. The front skirt fairing 106, the pair of side skirt fairings 108, the pair of vented skirt fairings 110, the pair of rear exhaust fairings 112, the transitions 114, and the corner pieces 116 of the aerodynamic skirt fairing system 102 may be coupled to the underside structures of cargo trailer 104 by any suitable method. In one embodiment, the components of the aerodynamic skirt fairing system 102 may be coupled to the transverse structural support members 170 extending between sides of the trailer 104.

In various embodiments, the components of the aerodynamic skirt fairing system 102 may be coupled to the cargo trailer 104 in accordance with the embodiments shown in the disclosure of U.S. Nonprovisional patent application Ser. No. 14/935,647, and U.S. Pat. Nos. 9,211,919, 8,727,425, and 8,303,025, which are incorporated here by reference.

In various embodiments, the components of the aerodynamic skirt fairing system 102 may be coupled to the cargo trailer 104 by an L-shaped bracket or a descending strut (not shown), as is under stood by one of ordinary skill in the art. In one embodiment, the L-shaped bracket or a descending strut (not shown) may be coupled to the transverse structural support members 170 extending between sides of the trailer 104. The L-shaped bracket or a descending strut may look similar to what is shown in the above referenced patents and patent application without the adjustability portions.

Figure 14:
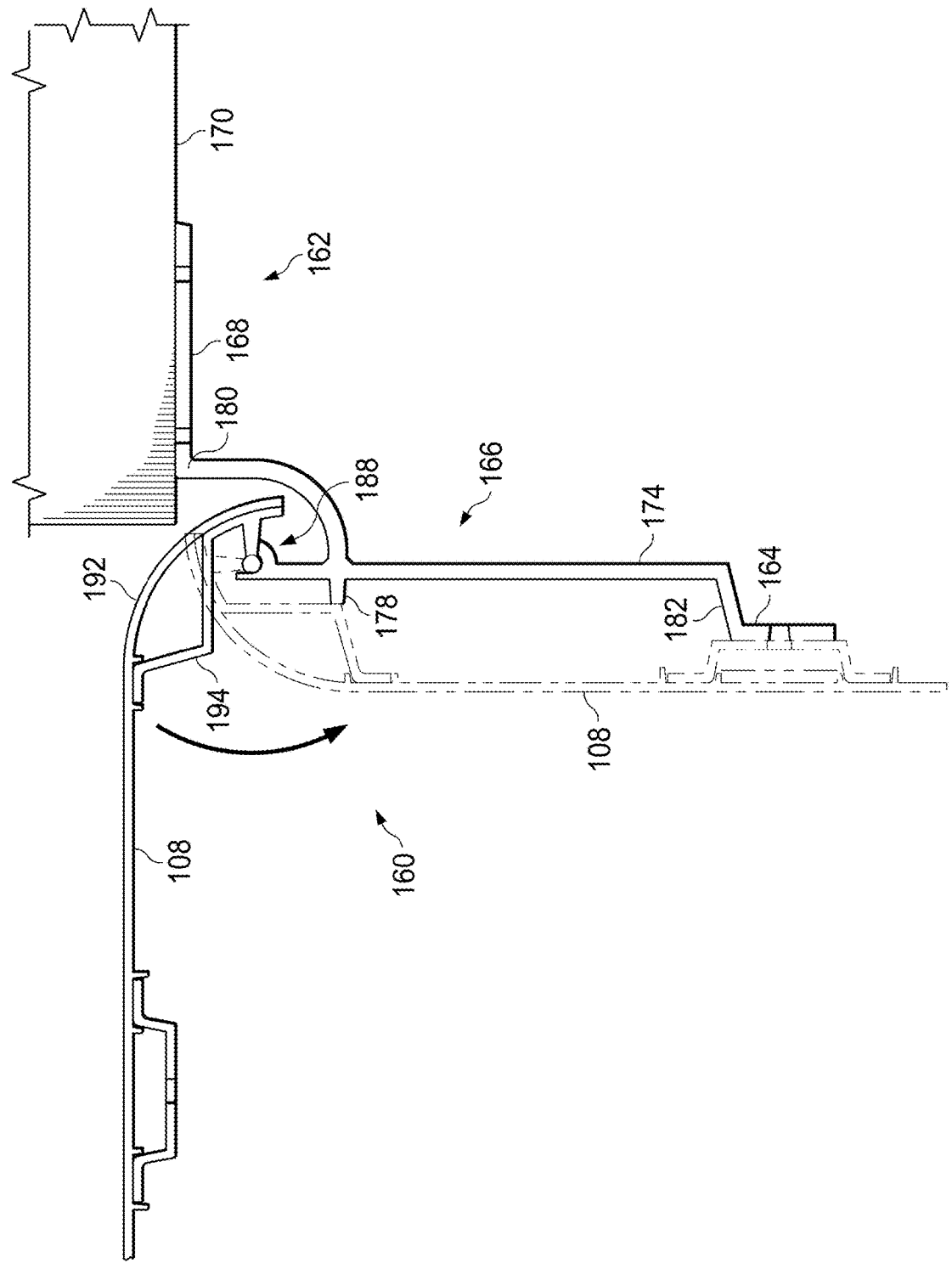
FIG. 14 representatively illustrates a rear view of a mounting system for the various skirt fairings in an open and closed position in accordance with an exemplary embodiment of the present technology.
Figure 15:
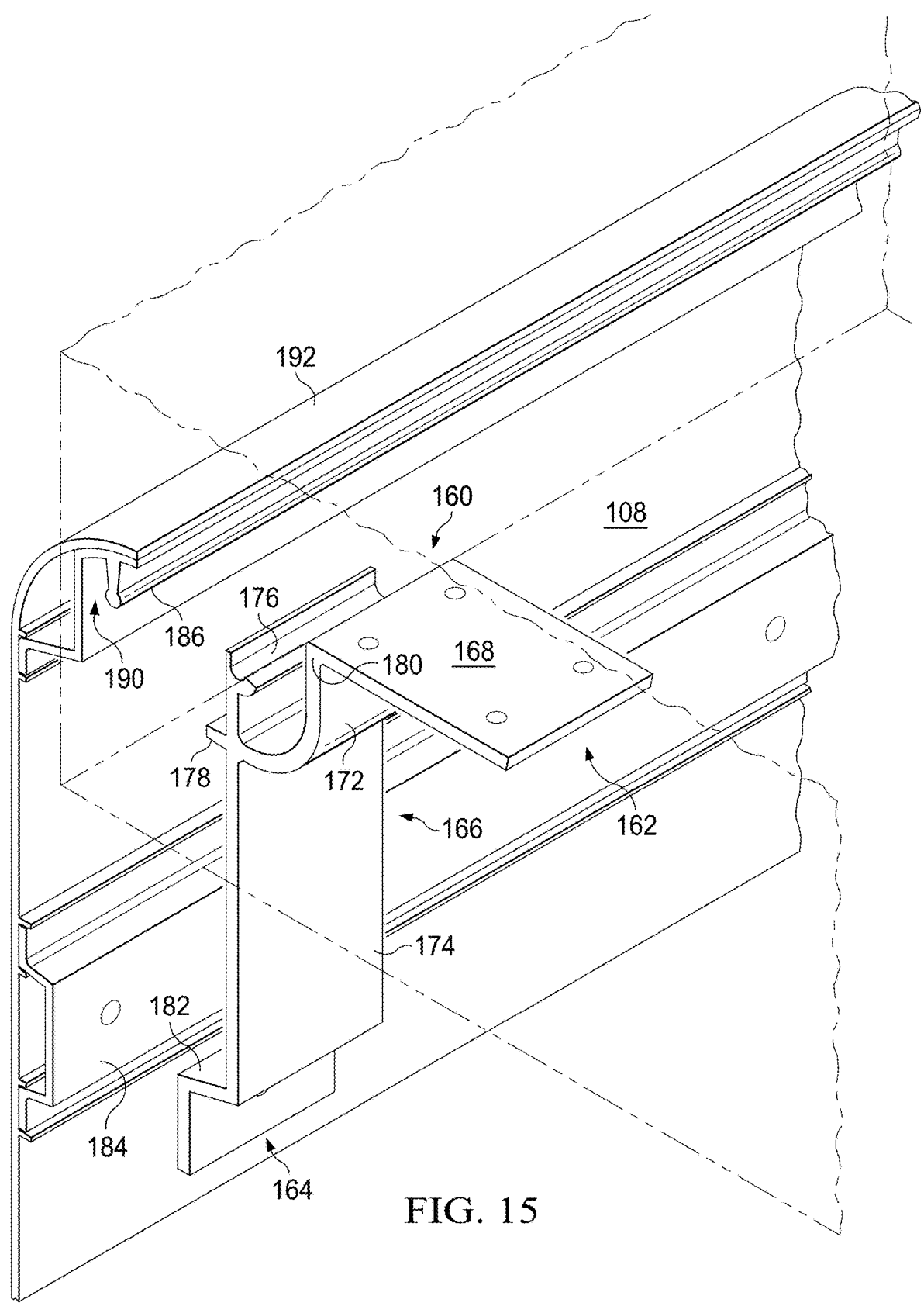
FIG. 15 representatively illustrates a partial, exploded, rear, perspective view of a mounting system for the various skirt fairings in a closed position in accordance with an exemplary embodiment of the present technology.
Figure 16:
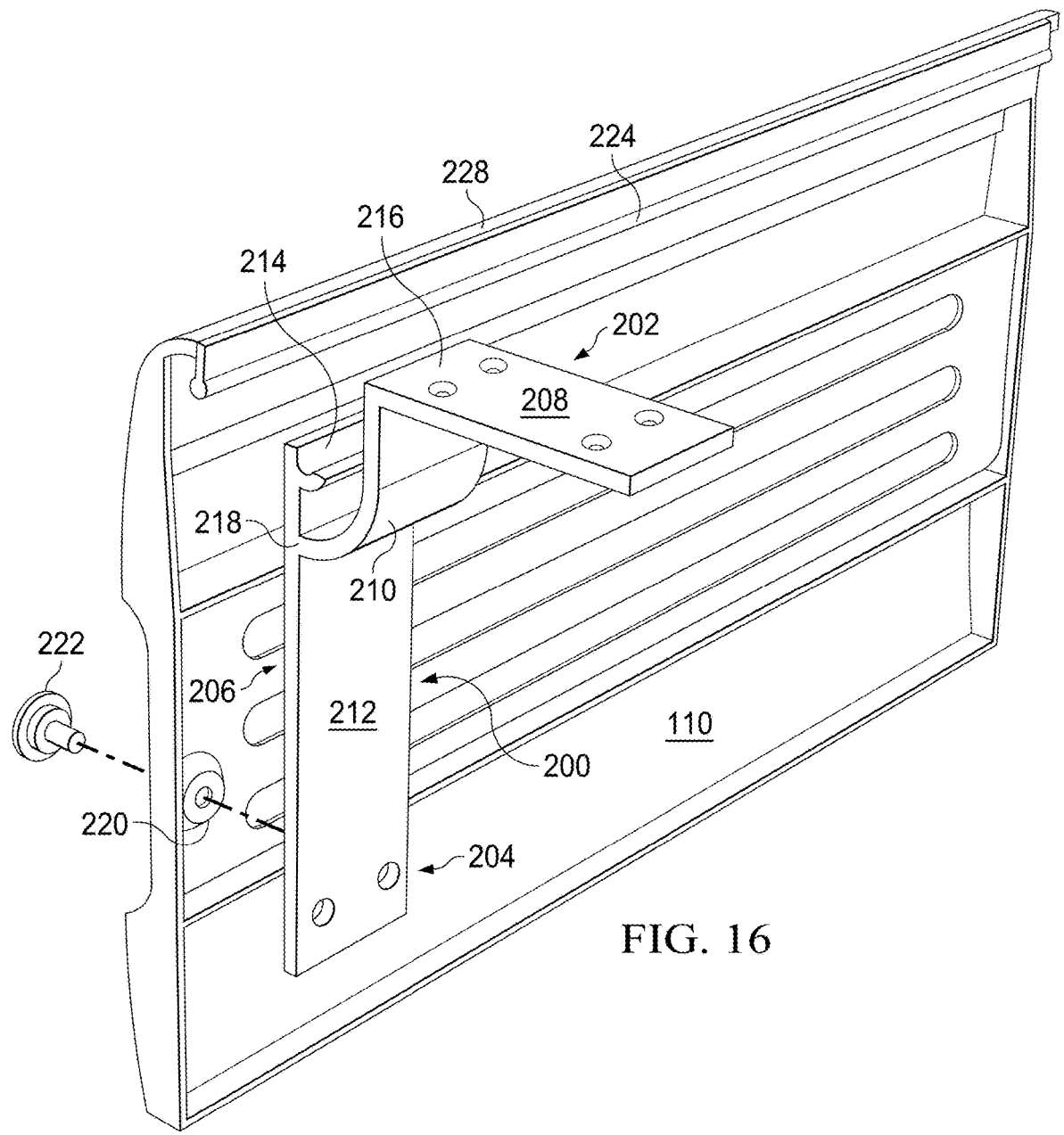
FIG. 16 representatively illustrates a partial, exploded, rear, perspective view of a mounting system for the various skirt fairings in a closed position in accordance with an exemplary embodiment of the present technology.

Referring now to FIGS. 14-16, a mounting system for the aerodynamic trucking system 100 will be discussed. In one embodiment, shown in FIGS. 14 and 15, a mounting system 160 for coupling the front skirt fairing 106 and the side skirt fairings 108 is shown. The mounting system 160 comprises an upper mount 162 and a lower mount 164 connected by an intermediate section 166. The upper mount 162 is oriented generally horizontal and comprises a mounting plate 168 having a number of apertures. The mounting plate 168 is configured to couple the mounting system 160 to transverse structural support members 170 extending between sides of the trailer 104 by a bolted connection. It should be understood that any fastening method contemplated such as welding, couplers, bracket, etc. will suffice.

Figure 13:
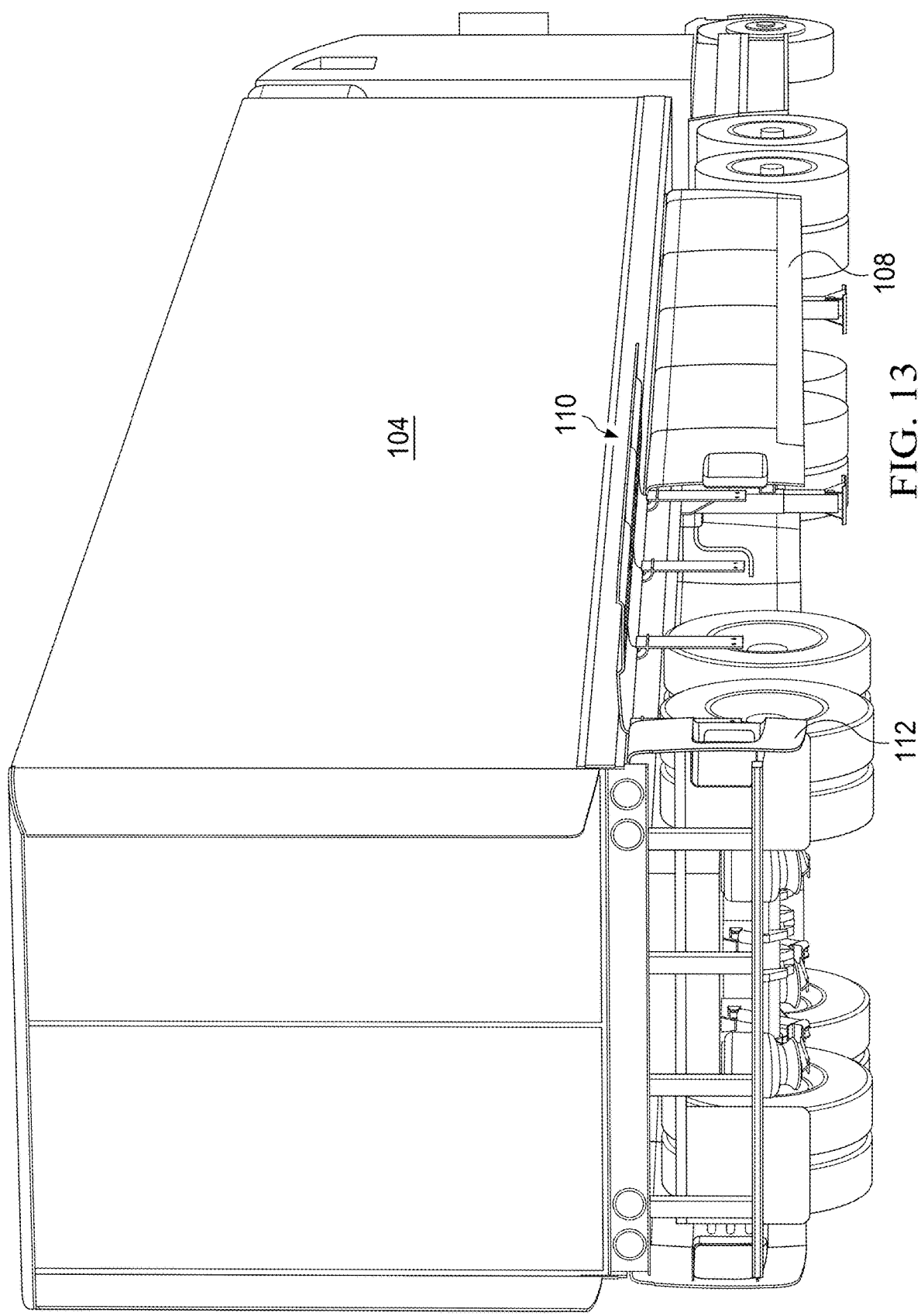
FIG. 13 representatively illustrates a partial, rear, perspective view of a truck and a trailer with an aerodynamic trucking system with a vented side skirt in an open position showing an alternative embodiment of the exit fairing system in accordance with an exemplary embodiment of the present technology.

The intermediate section 166 comprises an arcuate member 172, a vertical support 174, channel 176, and a stop 178. The arcuate member 172 depends downwardly and outwardly from an outward edge 180 of the mounting plate 168 and is coupled to the vertical support 174. The lower mount 164 is coupled to the vertical support 174 by an offset member 182. The lower mount 164 is coupled to a lower bracket 184 located on the side skirt fairing 108 by a quick release fastener (not shown). The channel 176 receives an elongate rod 186 to form a joint 188. The elongate rod 186 is formed in an upper bracket 190 shown attached to an upper portion 192 of the side skirt fairing 108. The upper bracket 190 and lower bracket 184 can be formed with the side skirt fairing 108. In operation, as shown in FIG. 14, the user may remove the fastener (not shown) to allow the side skirt fairing 108 to rotate about the joint 188 from a generally horizontal position (FIG. 13) to a generally vertical position, where the stop 178 rests upon a lower portion 194 of the upper bracket 190. The joint 188 connection of the elongate rod 186 within channel 176 provides a slidable coupling such that the side skirt fairing 108 may be adjusted linearly along the side of the trailer 104 during installation and maintenance. It should be understood that while not shown, in some embodiments, a similar configuration may be used to mount the front skirt fairing 106, the transition 114, and the corner pieces 116.

In another embodiment, shown in FIG. 16, a mounting system 200 for coupling the vented skirt fairings 110 will be discussed. The mounting system 200 comprises an upper mount 202 and a lower mount 204 connected by an intermediate section 206. The upper mount 202 is oriented generally horizontal and comprises a mounting plate 208 having a number of apertures. The mounting plate 208 is configured to couple the mounting system 200 to transverse structural support members 170 extending between sides of the trailer 104 by a bolted connection. It should be understood that any fastening method contemplated such as welding, couplers, bracket, etc. will suffice.

Figure 7:
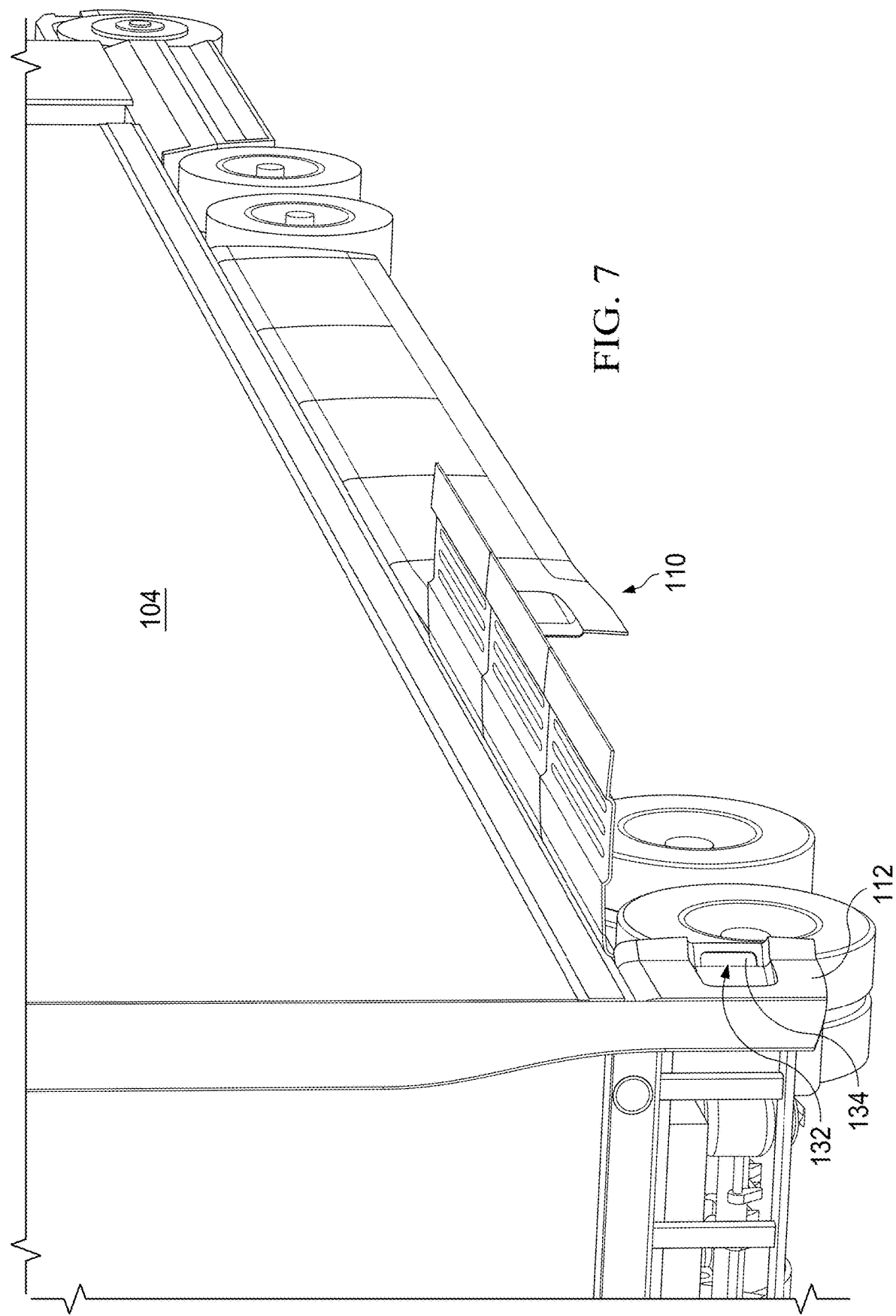
FIG. 7 representatively illustrates a partial, rear, perspective view of a truck and a trailer with a vented side skirt in an open position in accordance with an exemplary embodiment of the present technology.
Figure 8:
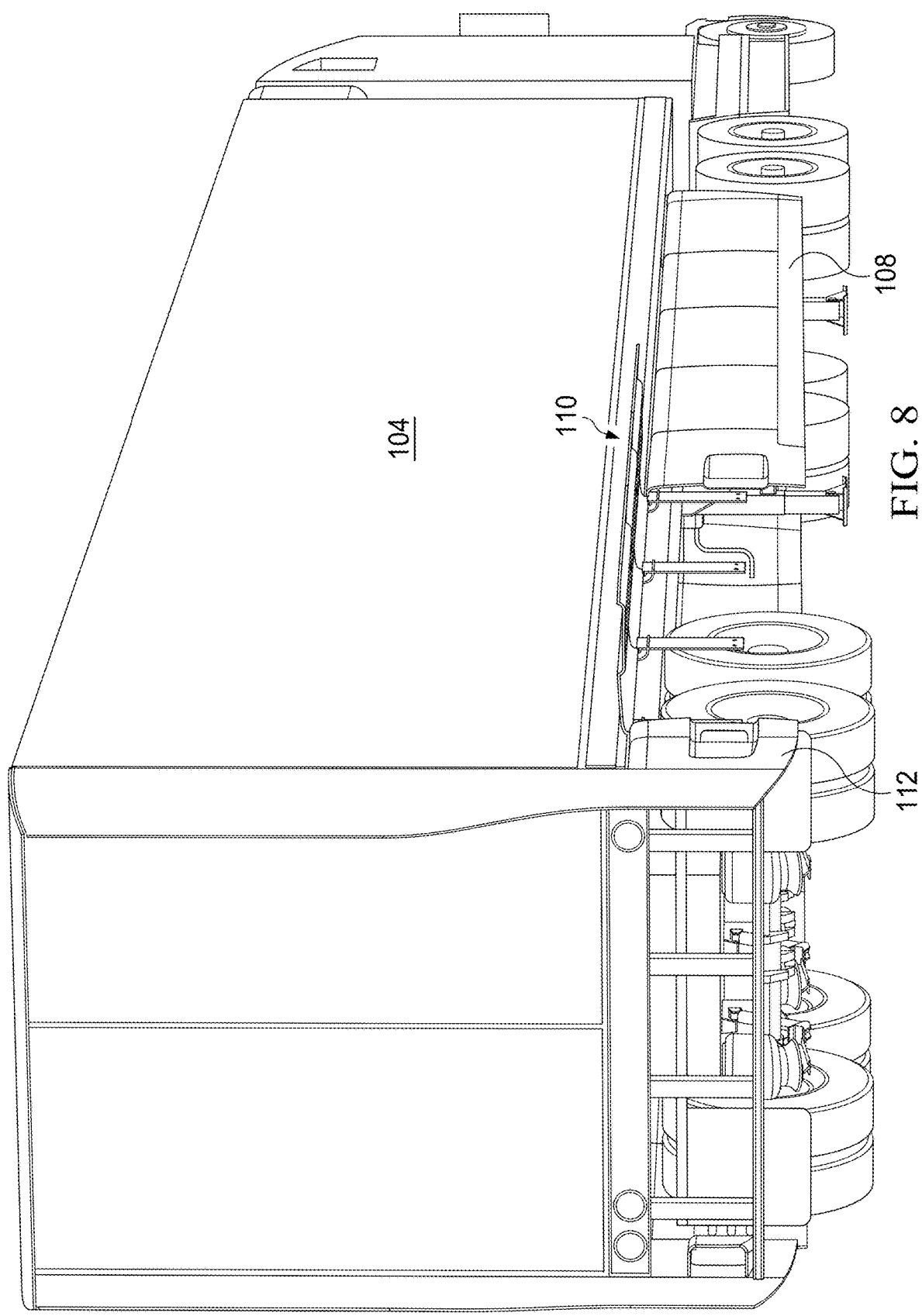
FIG. 8 representatively illustrates a partial, rear, perspective view of a truck and a trailer with an aerodynamic trucking system showing a vented side skirt in an open position in accordance with an exemplary embodiment of the present technology.

The intermediate section 206 comprises an arcuate member 210, a vertical support 212, and a channel 214. The arcuate member 210 depends downwardly and outwardly from an outward edge 216 of the mounting plate 208. The vertical support 212 extends downwardly from a lower portion 218 of the arcuate member 210. The lower mount 204 is located at the lower end of the vertical support 212. The lower mount 204 is coupled to a recessed aperture 220 located on the vented skirt fairings 110 by a quick release fastener 222. The channel 214 receives an elongate rod 224 to form a joint 226. The elongate rod 224 depends downwardly from an upper portion 228 of the vented skirt fairings 110. The elongate rod 224 can be formed with the vented skirt fairings 110. In operation, the user may remove the quick release fastener 222 so that the vented skirt fairings 110 may rotate about the joint 226 from a generally horizontal position (FIGS. 7 and 8) to a generally vertical position to allow for access to the trailer wheels, brakes, tire, etc. for maintenance. As such, the vented side skirt fairings 110 may be rotatably coupled to the cargo trailer 104 such that access to the wheels, tires, and axles is available. The joint 226 connection of the elongate rod 224 within channel 214 provides a slidable coupling such that the vented skirt fairings 110 may be adjusted linearly along the side of the trailer 104 during installation and maintenance. It should be understood that while not shown, in some embodiments, a similar configuration may be used to mount the front skirt fairing 106, the transition 114, and the corner pieces 116.

The above configurations maintain the vented skirt fairings 110 in generally vertical position during use, while permitting upward rotation of vented skirt fairings 110 in response to the needs of the user.

For example, the aerodynamic skirt fairing system 102 may be configured to be adjustably mounted to the transverse structural support members 170 of the cargo trailer 104, as shown. Each mounting system 160/200 may be configured to be adjustable along a linear axis to facilitate the above-noted optimized aerodynamic positioning of respective aerodynamic skirt fairing system 102 within a specific tractor-trailer setup.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to a preferred embodiment. However, changes and modifications may be made to the preferred embodiment without departing from the scope of the present technology. These and other changes or modifications are intended to be included within the scope of the present technology, as expressed in the following claims.

The invention claimed is:

1. An aerodynamic fairing assembly for attachment to a trailer of a tractor-trailer comprising a top, bottom, front, rear, a pair of sides, wheels having tires and brakes, and a trailer frame comprising transverse structural support members extending between sides of the trailer, and having at least one rear wheel assembly situated below the trailer frame, the aerodynamic fairing assembly comprising:
   a side skirt fairing comprising an inner surface and an outer surface;
   a transition located aft of the side skirt fairing and extending outwardly of a side of a trailer envelope; and
   one or more mounting brackets configured to couple the side skirt fairing and the transition to one or more or of the transverse structural support members.

2. The aerodynamic fairing assembly of claim 1, wherein the mounting brackets rotatably couple the side skirt fairing and the transition to one or more or of the transverse structural support members.

3. The aerodynamic fairing assembly of claim 1, wherein mounting bracket comprises an upper mount coupled to the one or more or of the transverse structural support members and a lower mount coupled to the inner surface of the side skirt fairing and the transition.

4. The aerodynamic fairing assembly of claim 1, wherein the transition is configured to allow air to flow around the tires and brakes during use.

5. The aerodynamic fairing assembly of claim 1, wherein the side skirt fairing is generally planar and formed by a plurality of sections.

6. The aerodynamic fairing assembly of claim 5, wherein the plurality of sections are secured together by first and second mating sections.

7. The aerodynamic fairing assembly of claim 5, wherein adjoining edges of the plurality of sections abut one another.

8. The aerodynamic fairing assembly of claim 5, wherein adjoining edges of the plurality of sections contact but are not coupled to one another.

9. The aerodynamic fairing assembly of claim 1, wherein an aft portion of the transition comprises an arc-shaped profile to accommodate the wheels of the trailer.

10. The aerodynamic fairing assembly of claim 1, wherein the skirt assembly is constructed from an injection molded material.

11. The aerodynamic fairing assembly of claim 10, wherein the injection molded material comprises an injection molded mixture of polycarbonate and ABS plastic.

12. The aerodynamic fairing assembly of claim 1, wherein the mounting brackets comprise a rod and channel and are configured to adjustably couple the side skirt fairing and the transition to the trailer transverse structural support members to adjust a lateral position of the side skirt fairing and the transition on the trailer.

13. The aerodynamic fairing assembly of claim 1, further comprising a front skirt fairing located forward of the side skirt fairing, extending transverse of the centerline of the trailer and coupled to a transverse structural support member.

14. The aerodynamic fairing assembly of claim 1, further comprising an exit fairing system comprising:
  a pair of side fairings coupled to the rear sides of the trailer and extending from the top of the trailer to the bottom of the trailer; and
  a top fairing coupled to the top rear of the trailer and extending between the pair of side fairings.

15. The aerodynamic fairing assembly of claim 14, wherein the pair of side fairings extend from the top of the trailer to proximate the bottom of the trailer.

16. The aerodynamic fairing assembly of claim 1, wherein the transition is canted outwardly at an angle less that approximately 12 degrees.

17. The aerodynamic skirt assembly of claim 1, further comprising an additional aerodynamic skirt assembly located on an opposite side of the trailer, comprising:
  a side skirt fairing comprising an inner surface and an outer surface;
  a transition located aft of the side skirt fairing and extending outwardly of a side of a trailer envelope; and
  one or more mounting brackets configured to couple the side skirt fairing and the transition to one or more or of the transverse structural support members.

18. An aerodynamic fairing assembly for attachment to a trailer of a tractor-trailer comprising a top, bottom, front, rear, a pair of sides, wheels having tires and brakes, and a trailer frame comprising transverse structural support members extending between sides of the trailer, the skirt assembly comprising:
  a side skirt fairing comprising an inner surface and an outer surface;
  a transition located aft of the side skirt fairing and extending outwardly of a side of a trailer envelope, wherein the transition is canted outwardly at an angle less that approximately 12 degrees; and
  one or more mounting brackets configured to couple the side skirt fairing and the transition to one or more or of the transverse structural support members.

19. An aerodynamic assembly for attachment to a trailer of a tractor-trailer comprising a top, bottom, front, rear, a pair of sides, wheels having tires and brakes, and a trailer frame comprising transverse structural support members extending between sides of the trailer, the skirt assembly comprising:
  a side skirt fairing comprising an inner surface and an outer surface;
  a transition located aft of the side skirt fairing and extending outwardly of a side of a trailer envelope, wherein the transition is canted outwardly at an angle less that approximately 12 degrees; and
  an exit fairing system comprising:
  a pair of side fairing coupled to the rear sides of the trailer and extending from the top of the trailer to the bottom of the trailer; and
  a top fairing coupled to the top rear of the trailer and extending between the pair of side fairings; and
  one or more mounting brackets configured to couple the side skirt fairing and the transition to one or more or of the transverse structural support members.

* * * * *